United States Patent
Nakagawa

(10) Patent No.: US 9,185,317 B2
(45) Date of Patent: Nov. 10, 2015

(54) IMAGE CAPTURING APPARATUS CAPABLE OF STORING FOCUS DETECTION DATA

(75) Inventor: Kazuo Nakagawa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 708 days.

(21) Appl. No.: 13/128,855

(22) PCT Filed: Oct. 28, 2009

(86) PCT No.: PCT/JP2009/068861
§ 371 (c)(1),
(2), (4) Date: May 11, 2011

(87) PCT Pub. No.: WO2010/055797
PCT Pub. Date: May 20, 2010

(65) Prior Publication Data
US 2011/0228127 A1 Sep. 22, 2011

(30) Foreign Application Priority Data
Nov. 14, 2008 (JP) .................................. 2008-292610

(51) Int. Cl.
*H04N 5/369* (2011.01)
*H04N 5/232* (2006.01)
(Continued)

(52) U.S. Cl.
CPC ............... *H04N 5/3696* (2013.01); *G02B 7/34* (2013.01); *G02B 7/36* (2013.01); *G03B 13/36* (2013.01);
(Continued)

(58) Field of Classification Search
CPC . H04N 5/3696; H04N 5/772; H04N 5/23212; H04N 5/23293; H04N 5/23219
USPC ................................ 348/222.1, 246, 273, 340
See application file for complete search history.

(56) References Cited

U.S. PATENT DOCUMENTS 6,819,360 B1 * 11/2004 Ide et al. ...................... 348/340
2008/0084483 A1 * 4/2008 Kusaka ..................... 348/222.1
(Continued)

FOREIGN PATENT DOCUMENTS

| JP | 2001-128044 A | 5/2001 |
| JP | 2001-128099 A | 5/2001 |

(Continued)

OTHER PUBLICATIONS

European Search Report for Counterpart European Application No. 09826047.4, dated Dec. 21, 2012.
(Continued)

*Primary Examiner* — Gevell Selby
(74) *Attorney, Agent, or Firm* — Carter, DeLuca, Farrell & Schmidt, LLP

(57) ABSTRACT

An image capturing apparatus includes an image sensor having a first pixel group that photoelectrically converts an object image from a first exit pupil region, a second pixel group that photoelectrically converts an object image from a second exit pupil region, and a third pixel group for capturing that photoelectrically converts an object image from overall exit pupil region; a focus detection unit that detects focus information by performing a defocus calculation with use of a first image signal obtained from the first pixel group and a second image signal obtained from the second pixel group; an image processing unit that converts captured image data into an image file for recording and saving; and a data recording unit that records, in association with the image file, signals obtained from the first pixel group and the second pixel group such that the defocus calculation can be performed.

21 Claims, 26 Drawing Sheets

(51) Int. Cl.
   *H04N 5/77* (2006.01)
   *G02B 7/34* (2006.01)
   *G02B 7/36* (2006.01)
   *G03B 13/36* (2006.01)
   *G11B 27/28* (2006.01)
   *H04N 1/32* (2006.01)
   *H04N 5/781* (2006.01)
   *H04N 5/907* (2006.01)
   *H04N 9/79* (2006.01)
   *H04N 9/804* (2006.01)
   *H04N 9/82* (2006.01)
   *H04N 101/00* (2006.01)

(52) U.S. Cl.
   CPC ............ *G11B 27/28* (2013.01); *H04N 5/23212* (2013.01); *H04N 5/23219* (2013.01); *H04N 5/23293* (2013.01); *H04N 5/772* (2013.01); *H04N 1/32128* (2013.01); *H04N 5/781* (2013.01); *H04N 5/907* (2013.01); *H04N 9/7921* (2013.01); *H04N 9/8047* (2013.01); *H04N 9/8205* (2013.01); *H04N 9/8227* (2013.01); *H04N 2101/00* (2013.01); *H04N 2201/3252* (2013.01); *H04N 2201/3277* (2013.01)

(56) References Cited

U.S. PATENT DOCUMENTS

| | | | |
|---|---|---|---|
| 2008/0199168 A1 | 8/2008 | Sakaguchi | |
| 2009/0128671 A1* | 5/2009 | Kusaka | 348/246 |
| 2009/0153705 A1* | 6/2009 | Katsuda et al. | 348/273 |
| 2010/0073527 A1* | 3/2010 | Ichimiya | 348/247 |

FOREIGN PATENT DOCUMENTS

| | | |
|---|---|---|
| JP | 2002-023241 A | 1/2002 |
| JP | 2003-204459 A | 7/2003 |
| JP | 2005-012307 A | 1/2005 |
| JP | 2005-148232 A | 6/2005 |
| JP | 2005-303409 A | 10/2005 |
| JP | 2006-238277 A | 9/2006 |
| JP | 2007-282106 A | 10/2007 |
| WO | 2008/032820 A1 | 3/2008 |
| WO | 2008/044524 A1 | 4/2008 |

OTHER PUBLICATIONS

Japanese Office Action issued in corresponding application No. 2014098885 on Mar. 20, 2015.

* cited by examiner

F I G. 2
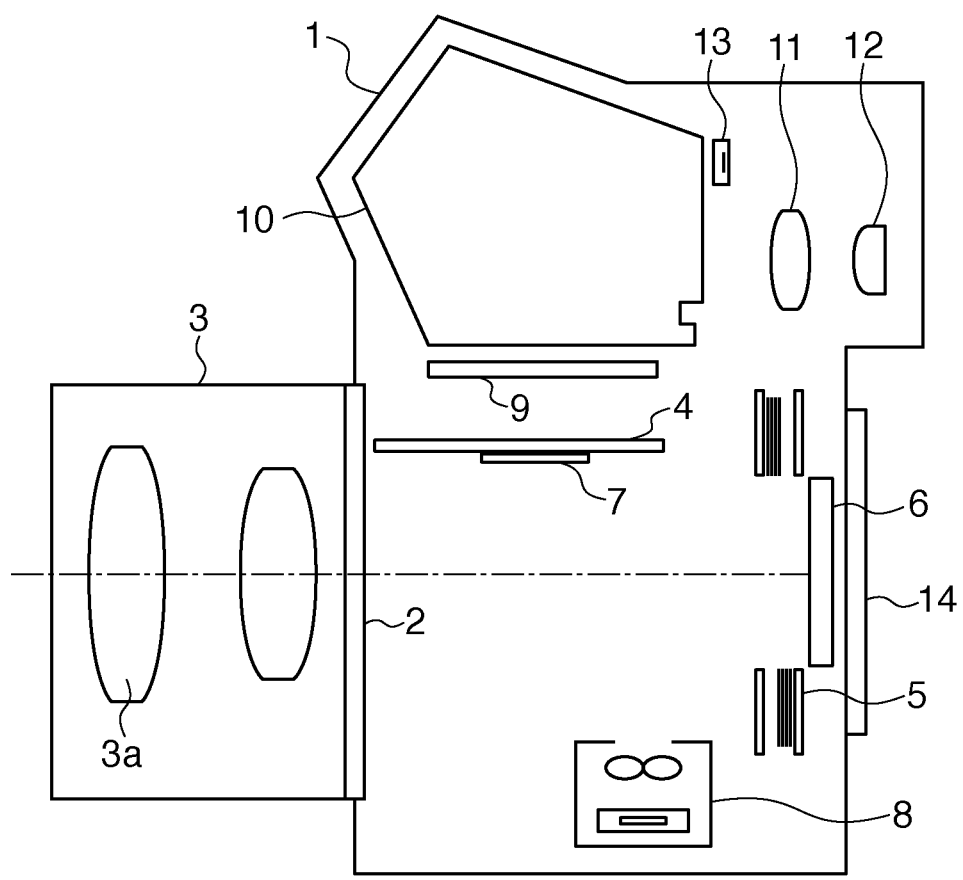

FIG. 5B
FIG. 5A
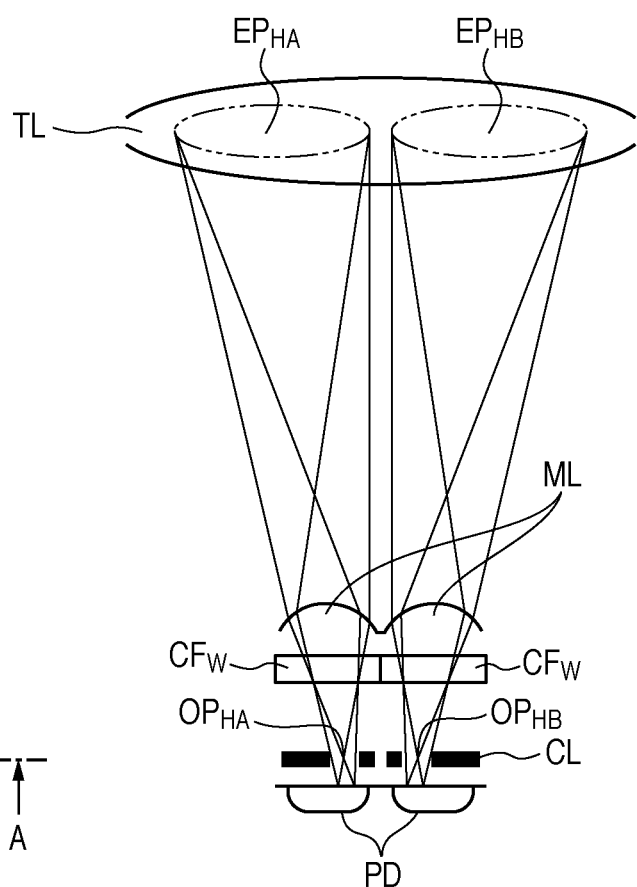
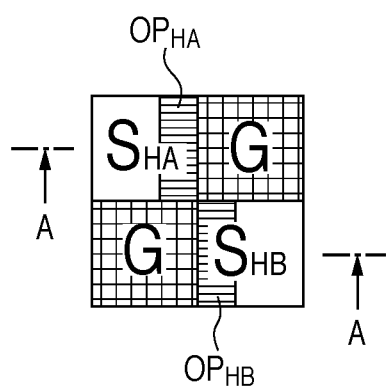

F I G. 8

IMAGE CAPTURING APPARATUS CAPABLE OF STORING FOCUS DETECTION DATA

CROSS REFERENCE TO RELATED APPLICATIONS

This application is a National Stage filing of PCT Application No. PCT/JP2009/068861 filed on Oct. 28, 2009, which claims priority from Japanese Patent Application No. 2008-292610 filed on Nov. 14, 2008, the disclosures of each of which are hereby incorporated by reference herein in their entirety.

TECHNICAL FIELD

The present invention relates to an image capturing apparatus in which phase difference AF in an image sensing plane is possible.

BACKGROUND ART

One feature of digital cameras is the ability to record a shooting date and time, camera setting values such as the exposure control value, and various photographing information such as lens information, along with image data in a captured image file.

For example, a digital camera has been proposed in which the focus detection point used in focusing control of the photographing lens is recorded, and when an image file is reproduced, the position of the focus detection point is displayed superimposed on the image (see Japanese Patent Laid-Open No. 2001-128044).

Also, an image capturing apparatus has been proposed in which it is possible to record a plurality of focus detection points that have been selected and focus detection data (e.g., distance information indicating the distance from the image sensing plane to the object) at such focus detection points (see Japanese Patent Laid-Open No. 2005-12307).

Information indicating such focus detection points and the focus detection data is used in various applications, such as determining whether an object has been captured as a user has intended, image manipulation, image management, and searching.

However, Japanese Patent Laid-Open No. 2001-128044 has the problem that only the focus detection point that was used in focusing control is known, and the focus detection data is not known.

Also, in Japanese Patent Laid-Open No. 2005-12307, focus detection data that has been recorded in a recorded image file is data from immediately before the image was actually captured, and although this is not a problem in the case of a still object, if the object is moving, the focus detection data and the image will not completely match due to a time lag from when focus detection is performed until the image is captured; accordingly, there is the problem that it is difficult to utilize the focus detection data.

DISCLOSURE OF INVENTION

The present invention has been achieved in view of the above issues, and according to the present invention, a focus detection point and focus detection data that are from the moment at which an image was captured are recorded in an image file, and such data can be used by a user.

An image capturing apparatus according to the present invention includes: an image sensor having a first pixel group that photoelectrically converts an object image from a first exit pupil region that is part of an overall exit pupil region of a photographing lens, a second pixel group that photoelectrically converts an object image from a second exit pupil region that is different from the first exit pupil region, and a third pixel group for capturing that photoelectrically converts an object image from an exit pupil region that includes the first exit pupil region and the second exit pupil region; a focus detection unit that detects focus information of the photographing lens by performing a defocus calculation with use of a first image signal obtained from the first pixel group and a second image signal obtained from the second pixel group; an image processing unit that converts captured image data that has been photoelectrically converted by at least the third pixel group of the image sensor and captured, into an image file for recording and saving; and a data recording unit that records, in association with the image file, signals obtained from the first pixel group and the second pixel group such that the defocus calculation can be performed.

Further features of the present invention will become apparent from the following description of exemplary embodiments with reference to the attached drawings.

BRIEF DESCRIPTION OF DRAWINGS

FIG. 2 is a cross-sectional view of the digital camera according to Embodiment 1 during live-viewing and capturing.

FIGS. 5A and 5B are diagrams for describing a structure of focus detection pixels that are used in the image sensor shown in FIG. 1.

FIG. 8 is a diagram illustrating the pixel array of the highest order unit of the image sensor shown in FIG. 1.

BEST MODE FOR CARRYING OUT THE INVENTION

Below is a detailed description of embodiments of the present invention with reference to the drawings.

Embodiment 1

Figure 1:
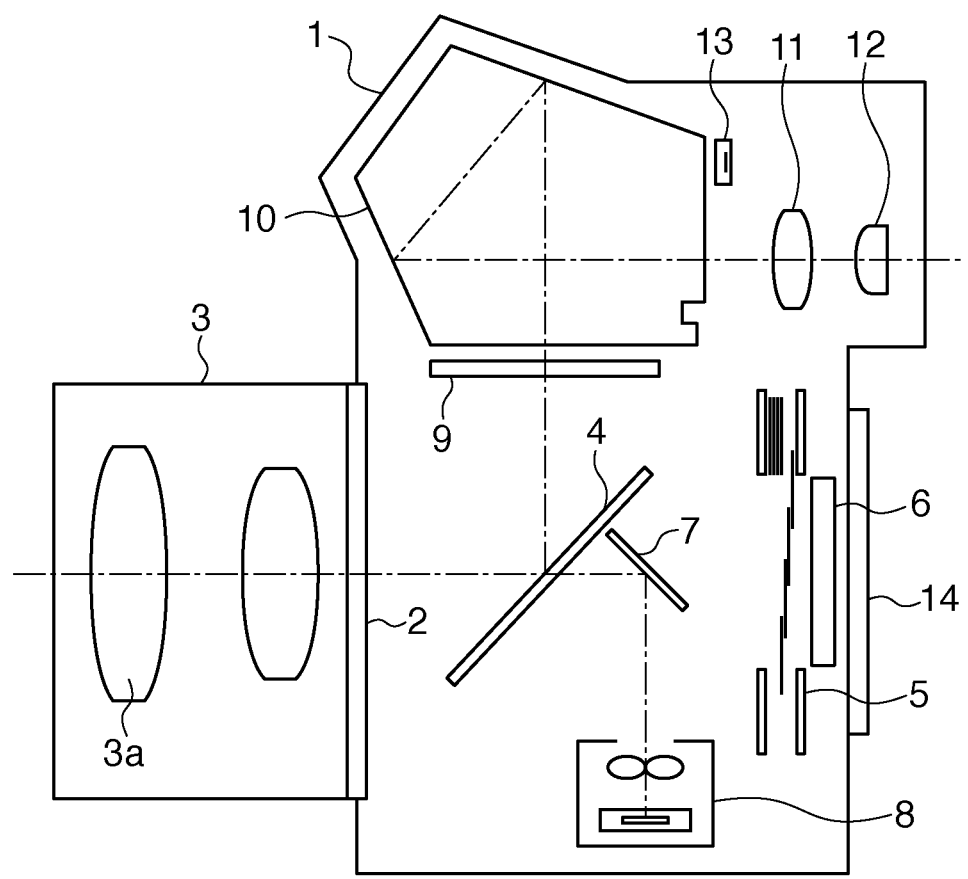
FIG. 1 is a cross-sectional view of a digital camera according to Embodiment 1 during finder observing.

FIGS. 1 and 2 are cross-sectional views of a digital single-lens reflex camera that is Embodiment 1 of an image capturing apparatus of the present invention.

Reference character 1 denotes a camera body, and reference character 2 denotes a mount that enables a later-described photographing lens 3 to be attached to and detached from the camera body 1, and that has an interface unit for the communication of various types of signals and a supply of driving power. Reference character 3 denotes the replaceable photographing lens, which includes a focus lens group, a zoom lens group, and a diaphragm apparatus that is not shown. In FIGS. 1 and 2, each lens group is shown as a single lens for the sake of convenience, and for example, the focus lens group is shown as a focus lens 3a. However, the photographing lens 3 is actually configured by a complex combination of lens groups that include many lenses. Note that the focusing lens 3a is not limited to being the front-side lens of the photographing lens 3 as shown in FIGS. 1 and 2.

Reference character 4 denotes a main mirror that is configured by a half mirror and can rotate in accordance with the operating state of the camera. When an object is to be observed through the finder, the main mirror 4 is set so as to be tilted in the photographing optical path, and thus the main mirror 4 bends a light beam from the photographing lens 3 and guides the light beam to a later-described finder optical system (FIG. 1). During capturing and live-viewing, the main mirror 4 retreats from the photographing optical path, and thus guides a light beam from the photographing lens 3 to a later-described image sensor 6 (FIG. 2). Reference character 5 denotes a shutter for controlling the incidence of a light beam from the photographing lens 3 on the later-described image sensor 6, whereby the shutter 5 is normally in a closed state (FIG. 1), and in an open state during capturing and live-viewing (FIG. 2).

Reference character 6 denotes the image sensor, which is configured by a CMOS image sensor and peripheral circuits thereof. The image sensor 6 is configured so that independent output from all pixels is possible. Also, some of the pixels are focus detection pixels, thus enabling focus detection using a method of detecting a phase difference on the image sensing plane (phase difference AF). More specifically, the image sensor 6 has a plurality of capturing pixels that generate an image of an object by receiving light that has passed through all regions of the exit pupil (the later-described EP) of the photographing lens 3 that forms the image of the object. The image sensor 6 furthermore has a plurality of focus detection pixels that receive light that has passed through some regions (the later-described EPHA and EPHB) of the exit pupil EP of the photographing lens 3. Altogether, the focus detection pixels can receive light that has passed through all regions of the exit pupil of the photographing lens 3.

Reference character 7 denotes a sub mirror that rotates along with the main mirror 4, and when the main mirror 4 is set so as to be tilted in the photographing optical path, the sub mirror 7 bends a light beam that has passed through the main mirror 4 toward a later-described AF sensor 8, and guides the light beam to the AF sensor 8 (FIG. 1). During capturing and live-viewing, the sub mirror 7 retreats from the photographing optical path by rotating along with the main mirror 4 (FIG. 2). The sub mirror 7 is not a half-mirror, and therefore shields the image sensor 6 from light. Reference character 8 denotes the AF sensor, which is configured by, for example, a secondary image forming lens and an area sensor composed of CCDs or CMOSs, and which enables phase difference AF.

Reference character 9 denotes a focusing screen disposed in a primary imaging plane of the photographing lens 3, whereby a Fresnel lens (condenser lens) is provided on the incidence face of the focusing screen 9, and an object image (finder image) is formed on the exit face of the focusing screen 9. Reference character 10 denotes a pentaprism for changing the optical path of the finder, and the pentaprism 10 converts the object image formed on the exit face of the focusing screen 9 into an upright non-reverse image. Reference characters 11 and 12 each denote an eyepiece. Here, the optical system configured by the focusing screen 9, the pentaprism 10, and the eyepieces 11 and 12 are called the finder optical system.

Reference character 13 denotes an automatic exposure (AE) sensor, which is configured from photodiodes in one-to-one correspondence with regions in a multi-divided capturing region, and the AE sensor 13 measures the luminance of an object image formed on the exit face of the focusing screen 9. Reference character 14 denotes a liquid crystal monitor (display unit) that displays captured images and various types of photographing information. In the live-view mode, the liquid crystal monitor 14 displays an image of an object (object image) captured by the image sensor 6, and also displays an AF frame that can be set by a later-described multicontroller 33, which is an AF frame setting unit, and the AF frame that has been set by the multicontroller 33.

Figure 3:
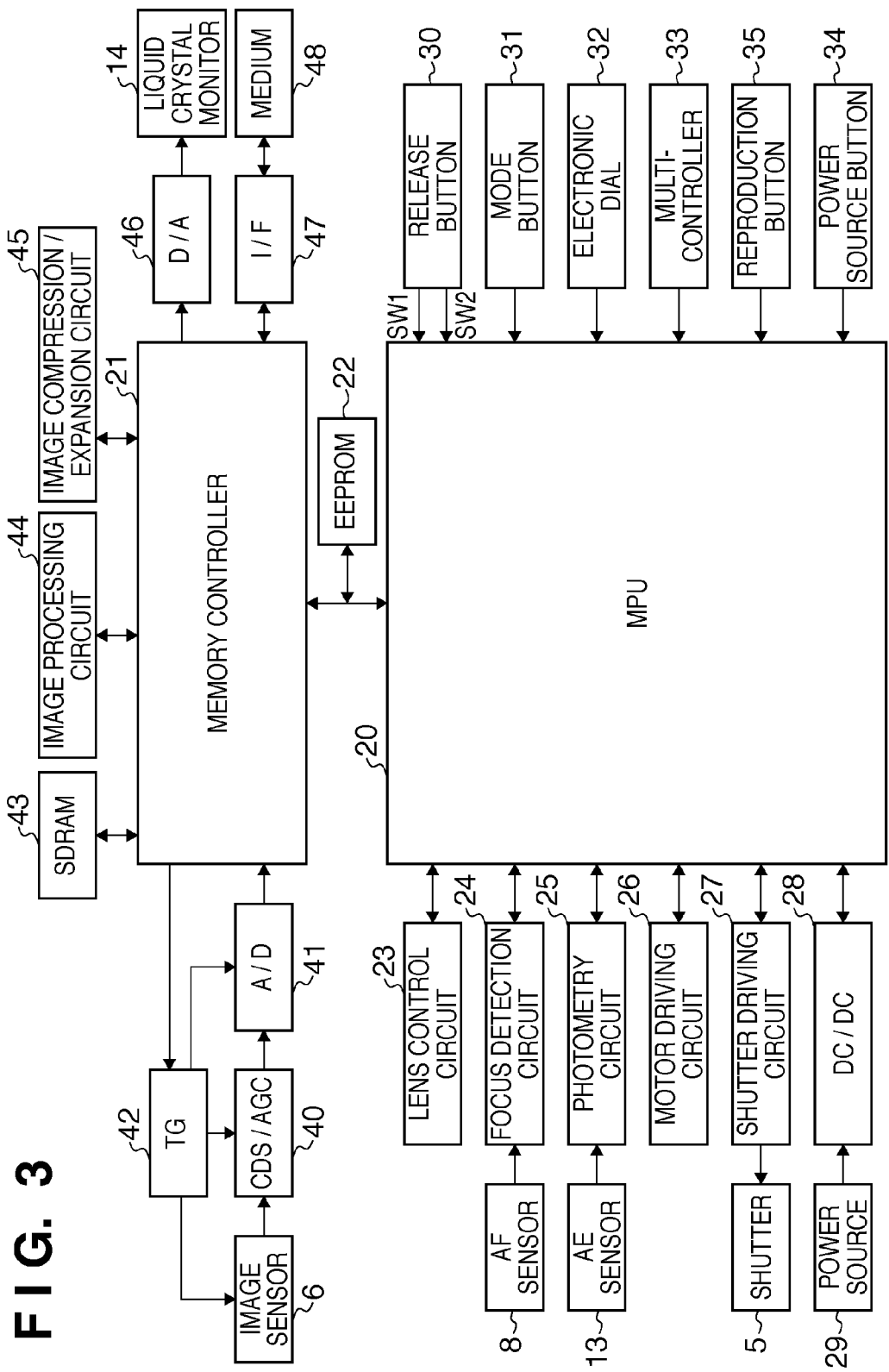
FIG. 3 is a block diagram showing a control system of the digital camera shown in FIG. 1.

FIG. 3 is a block diagram showing a control system of the digital single-lens reflex camera.

Reference character 20 denotes a microcomputer (a central processor, hereinafter called an "MPU") that controls the camera unit and performs overall control of the camera. The MPU (control unit) 20 calculates an amount of defocus of a focus detection frame by performing phase difference AF on an AF frame that has been set by the multicontroller 33, which is the later-described frame setting unit, by performing calculation on output signals from focus detection pixels in the AF frame.

Reference character 21 denotes a memory controller that performs various types of control on image data, and reference character 22 denotes an EEPROM that stores, for example, adjustment data and settings for performing various types of control. Reference character 23 denotes a lens control circuit in the photographing lens 3, whereby the lens control circuit 23 is connected to the MPU 20 via the mount 2, and performs driving of an aperture (not shown) and focus adjustment (focus driving) on the focus lens group (not shown) based on various information that is described later.

Reference character 24 denotes a focus detection circuit that performs accumulation control and reading control with respect to the area sensor of the AF sensor 8, and outputs pixel information at each focus detection point to the MPU 20. The MPU 20 performs known phase difference AF with use of the pixel information at each focus detection point, sends detected focus detection information to the lens control circuit 23, and performs focus adjustment on the focus lens group (not shown). The series of operations from focus detection to focus adjustment is called the AF operation.

Reference character 25 denotes a photometry circuit that outputs luminance signals from each region of the AE sensor 13 to the MPU 20. The MPU 20 performs A/D conversion on the luminance signals to obtain photometry information regarding the object, and calculates and sets the capturing exposure with use of such photometry information. The series of operations from obtaining such photometry information to setting the capturing exposure is called the AE operation.

Reference character 26 denotes a motor driving circuit that controls a motor (not shown) that drives the main mirror 4 and a motor (not shown) that charges the shutter 5. Reference character 27 denotes a shutter driving circuit that controls the supply of power to a coil (not shown) for opening and closing the shutter 5. Reference character 28 denotes a DC/DC converter that converts the voltage of a power source 29 into a voltage required by the circuits.

Reference character 30 denotes a release button that outputs a signal of an SW1 and an SW2 to the MPU 20. SW1 is a switch for starting photometry (AE) and the AF operation, and is set to ON by a first stroke (half-press) operation of the release button 30. SW2 is a switch for starting the exposure operation, and is set to ON by a second stroke (full-press) operation of the release button 30. Reference character 31 denotes a mode button, and when a later-described electronic dial 32 or the multicontroller 33 is operated after the mode button 31 has been operated, one of various modes is selected in accordance with such input, and the selected mode is determined when the mode button 31 is operated again. For example, the type of recording image quality of captured images can be changed. Reference character 32 denotes the electronic dial that outputs an ON signal in accordance with rotational clicking of the dial to an up/down counter (not shown) in the MPU 20, and the number of rotational clicks is counted. Selection of various numerical values, data, and the like is performed in accordance with such counting.

Reference character 33 denotes the multicontroller (MC), which is an input apparatus used in the selection and determination of various modes and the AF frame (focus detection frame) displayed on the liquid crystal monitor 14 during later-described live-viewing. The multicontroller 33 can be used to perform eight types of directional input, namely up, down, left, right, upper-right, lower-right, upper-left, and lower-left, as well as input by a pressing operation. The multicontroller 33 functions as a mode setting unit that sets the live-view mode. The multicontroller 33 also functions as a frame setting unit that sets the AF frame that is the target of focus detection to an arbitrary position in the capturing region of the image sensor 6. Reference character 34 denotes a power source button, and the power source of the camera is turned ON/OFF when the power source button 34 is operated. Reference character 35 denotes a reproduction button, and an image recorded on a later-described medium 48 is displayed on the liquid crystal monitor 14 when the reproduction button 35 is operated.

Reference character 40 denotes a CDS/AGC (Correlated Double Sampling/Automatic Gain Control) circuit that samples and holds image signals output from the image sensor 6 and performs automatic gain control. Reference character 41 denotes an A/D converter that converts the analog output of the CDS/AGC circuit 40 into a digital signal. Reference character 42 denotes a TG (Timing Generation) circuit that supplies a driving signal to the image sensor 6, supplies a sample-and-hold signal to the CDS/AGC circuit 40, and supplies a sample clock signal to the A/D converter 41.

Reference character 43 denotes an SDRAM (memory) for temporarily recording, for example, an image that has been digitally converted by the A/D converter 41. The SDRAM 43 can record output signals from focus detection pixels in all regions of the capturing region of the image sensor 6. Alternatively, the SDRAM 43 can calculate an amount of defocus by performing phase difference AF on all regions of the capturing region of the image sensor 6, and record the amount of defocus.

Reference character 44 denotes an image processing circuit that performs Y/C (luminance signal/color difference signal) separation, white balance correction, γ correction, and the like. Reference character 45 denotes an image compression/expansion circuit that compresses images in accordance with the JPEG format or the like, and expands compressed images. Here, the memory controller 21 can obtain photometry information regarding an object by causing the image processing circuit 44 to perform image processing on an image signal output from the image sensor 6. Reference character 46 denotes a D/A converter that converts an image recorded in the SDRAM 43 or the later-described medium 48 into an analog signal so the image can be displayed on the liquid crystal monitor 14. Reference character 47 denotes an I/F (interface) with the medium 48 for recording/saving images.

Next is a description of image sensing plane phase difference AF performed by the image sensor 6.

In the present embodiment, the following description takes the example of an image sensor whose pixel pitch is 8 μm, whose effective pixel number is 3000 rows vertically×4500 columns horizontally=13.5 million pixels, and whose capturing screen size is 36 mm horizontally×24 mm vertically. Also, this image sensor 6 is a two-dimensional single-chip color sensor in which a Bayer array primary color mosaic filter has been formed on-chip on light receiving pixels.

FIGS. 4A to 6B are diagrams for describing the structure of the capturing pixels and the focus detection pixels. The present embodiment employs a Bayer array in which, among a 2-row by 2-column group of four pixels, pixels that have G (green) spectral sensitivity are disposed as two pixels in opposing corners, and a pixel having R (red) spectral sensitivity and a pixel having B (blue) spectral sensitivity are disposed as the two other pixels. Also, focus detection pixels whose structure is described later are disposed discretely within the Bayer array according to a predetermined rule.

Figure 4B:
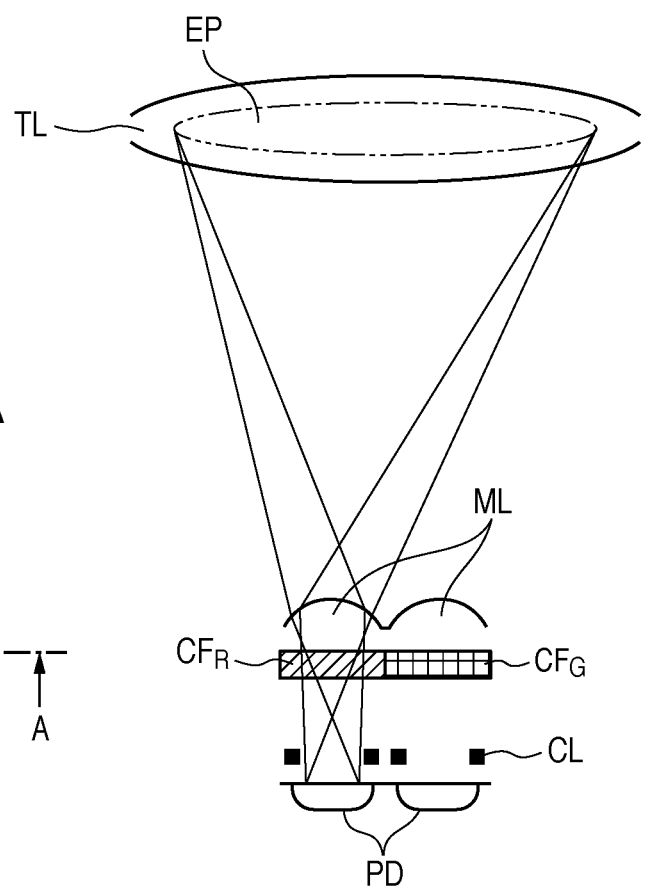
FIGS. 4A and 4B are diagrams for describing a structure of capturing pixels that are used in an image sensor shown in FIG. 1.
Figure 4A:
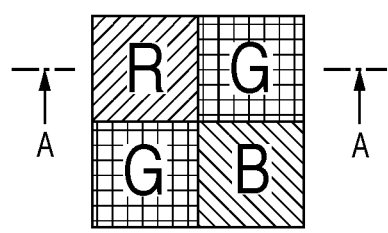

FIGS. 4A and 4B show the arrangement and structure of the capturing pixels.

FIG. 4A is a plan view of a 2-row by 2-column group of capturing pixels (third pixel group). As is known, in the Bayer array, G pixels are arranged diagonally in opposing corners, and a R pixel and a B pixel are arranged as the other two pixels. Also, the two-row by two-column structure is arranged repeatedly. FIG. 4B shows a cross-sectional view taken along A-A in FIG. 4A. Reference character ML denotes on-chip microlenses disposed on top of each pixel, reference character CFR denotes a R (red) color filter, and reference character CFG denotes a G (green) color filter. Reference character PD (Photo Diode) schematically shows a photoelectric conversion element of a CMOS image sensor. Reference character CL (Contact Layer) denotes a wiring layer for forming signal lines via which various types of signals are transmitted in the CMOS image sensor. Reference character TL (Taking Lens) schematically shows a photographing optical system of the photographing lens 3.

Here, the on-chip microlenses ML and photoelectric conversion elements PD of the capturing pixels are configured so that a light beam that has passed through the photographing optical system TL is received as effectively as possible. In other words, the exit pupil EP (Exit Pupil) of the photographing optical system TL and the photoelectric conversion elements PD are in a conjugate relationship due to the microlenses ML, and furthermore have been designed so that the effective area of the photoelectric conversion elements is large. Note that the capturing pixels receive light that has passed through all exit pupil regions of the photographing optical system TL. Also, although only a light beam that is incident on the R pixel is shown in FIG. 4B, this structure is the same for the G pixels and the B (blue) pixel. Accordingly, the exit pupil EP corresponding to each of the RGB capturing pixels has a large diameter, and a light beam (photons) from the object is received efficiently, thus improving the S/N of the image signal.

FIGS. 5A and 5B show the arrangement and structure of focus detection pixels for performing pupil division in the horizontal direction (left-right direction or lateral direction) of the photographing optical system (division into a first exit pupil region and a second exit pupil region). Here, the horizontal direction refers to, in the case in which the image capturing apparatus is constructed so that the optical axis of the photographing optical system and the long side of the capturing region are parallel to the ground, the direction that is orthogonal to the optical axis and furthermore conforms to a straight line extending in the horizontal direction. FIG. 5A is a plan view of a 2-row by 2-column group of pixels that includes focus detection pixels. In the case of obtaining an image signal for recording or viewing, the main component of the luminance information is acquired with G pixels. Also, since the image recognition characteristics of humans are such that sensitivity to luminance information is high, a degradation in image quality is readily perceptible when there is a shortage of G pixels. On the other hand, the R pixels and B pixels are pixels that acquire color information (color difference information), and since the visual characteristics of humans are such that sensitivity to color information is low, a degradation in image quality is not readily perceived even if there is somewhat of a shortage in the pixels that acquire color information. In view of this, in the present embodiment, among the pixels in the two-row by two-column group of pixels, the G pixels have been left as capturing pixels, and the R pixel and the B pixel have been replaced with focus detection pixels (first pixel group and second pixel group). In FIG. 5A, these focus detection pixels are indicated by reference characters SHA and SHB.

FIG. 5B shows a cross-sectional view taken along A-A shown in FIG. 5A. The structure of the microlenses ML and the photoelectric conversion elements PD is the same as the structure in the capturing pixels shown in FIG. 4B. In the present embodiment, since signals from the focus detection pixels are not used in image generation, a transparent film CFW (white) has been disposed in place of the color separation filters. Also, in order to perform pupil division in the image sensor 6, apertures in the wiring layer CL are biased in one direction relative to the center line of the microlenses ML. Specifically, an aperture OPHA of the pixel SHA is biased towards the right, and the pixel SHA receives a light beam that has passed through an exit pupil EPHA on the left side of the photographing optical system TL. An aperture OPHB of the pixel SHB is biased towards the left, and the pixel SHB receives a light beam that has passed through an exit pupil EPHB on the right side of the photographing optical system TL. The pixels SHA are arranged regularly in the horizontal direction, and an object image acquired by a group of such pixels is considered to be an A image (first image signal). The pixels SHB are also arranged regularly in the horizontal direction, and an object image acquired by a group of such pixels is considered to be a B image (second image signal). Accordingly, an amount of defocus (focus information) in an object image can be detected by detecting the relative positions of the A image and the B image. Note that with the pixels SHA and SHB, it is possible to perform focus detection in the case of an object image that has a luminance distribution in the horizontal direction of the capturing region (e.g., a vertical line), but it is not possible to perform focus detection in the case of a horizontal line that has a luminance distribution in the vertical direction. In view of this, in order to enable detection of the focusing state in the latter case as well, the present embodiment is configured so as to also include pixels that perform pupil division in the vertical direction (longitudinal direction) of the photographing optical system as well.

Figure 6B:
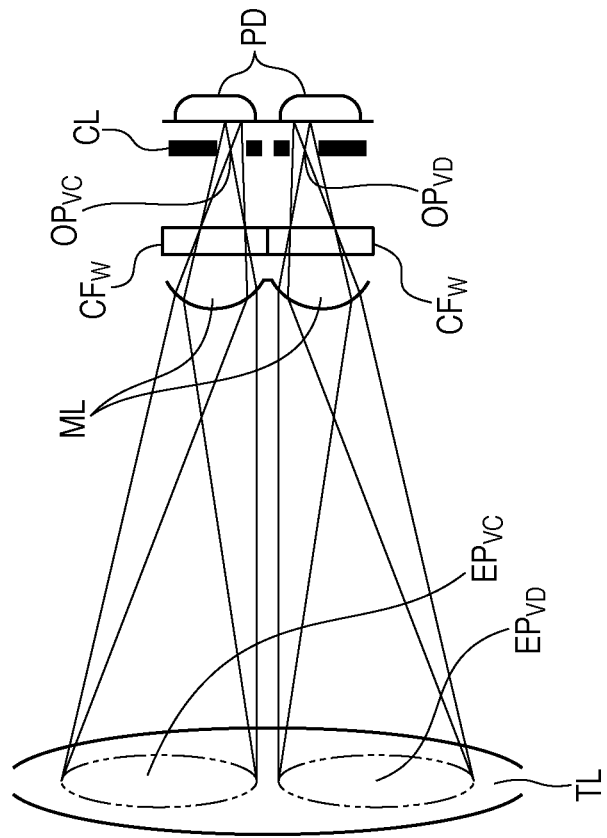
FIGS. 6A and 6B are diagrams for describing a structure of other focus detection pixels that are used in the image sensor shown in FIG. 1.
Figure 6A:
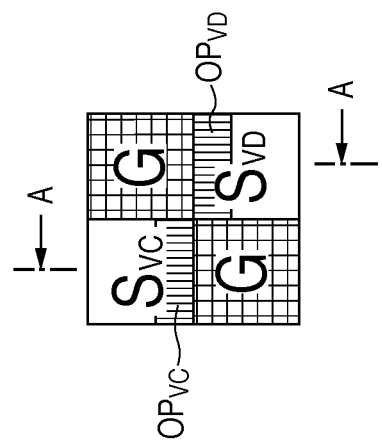

FIGS. 6A and 6B show the arrangement and structure of focus detection pixels for performing pupil division in the vertical direction (up-down direction or longitudinal direction) of the photographing optical system. Here, the vertical direction refers to, in the case in which the image capturing apparatus is constructed so that the optical axis of the photographing optical system and the long side of the capturing region are parallel to the ground, the direction that is orthogonal to the optical axis and furthermore conforms to a straight line extending in the vertical direction. FIG. 6A is a plan view of a 2-row by 2-column group of pixels that includes focus detection pixels, and similarly to FIG. 5A, the G pixels have been left as capturing pixels, and the R pixel and the B pixel have been replaced with focus detection pixels. In FIG. 6A, these focus detection pixels are indicated by reference characters SVC and SVD.

FIG. 6B shows a cross-sectional view taken along A-A shown in FIG. 6A. The structure of the pixels shown in FIG. 6B is the same as the structure shown in FIG. 5B, with the exception that whereas the pixels shown in FIG. 5B perform lateral pupil division, the pixels shown in FIG. 6B perform longitudinal pupil division. An aperture OPVC of the pixel SVC is biased toward the bottom, and the pixel SVC receives a light beam that has passed through an exit pupil EPVC on the top side of the photographing optical system TL. Similarly, an aperture OPVD of the pixel SVD is biased toward the top, and the pixel SVD receives a light beam that has passed through an exit pupil EPVD on the bottom side of the photographing optical system TL. The pixels SVC are arranged regularly in the vertical direction, and an object image acquired by a group of such pixels is considered to be a C image. The pixels SVD are also arranged regularly in the vertical direction, and an object image acquired by a group of such pixels is considered to be a D image. Accordingly, an amount of defocus (ranging information) in an object image having a luminance distribution in the vertical direction can be detected by detecting the relative positions of the C image and the D image.

Figure 7:
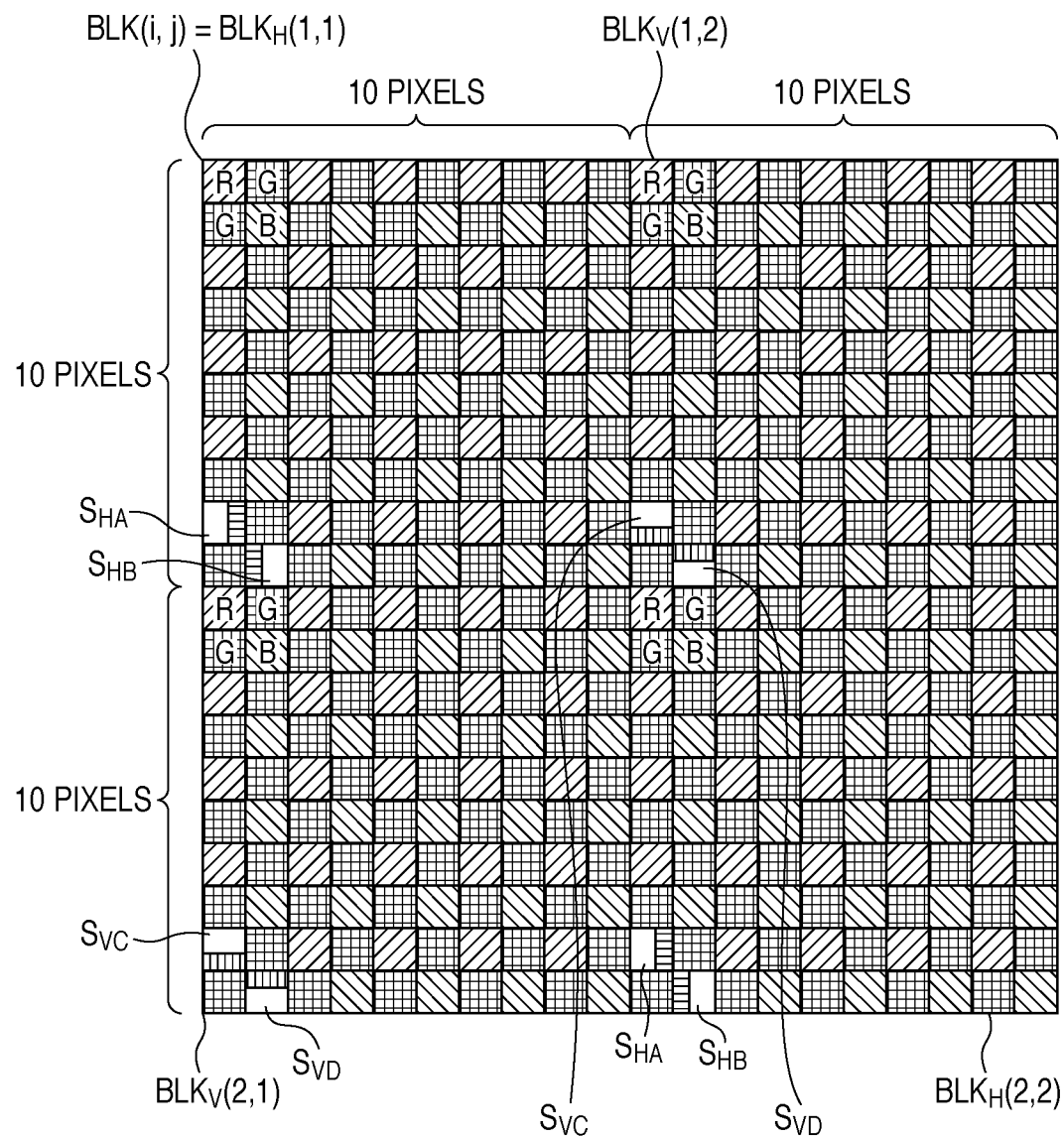
FIG. 7 is a diagram illustrating the pixel array of the smallest unit of the image sensor shown in FIG. 1.
Figure 8:
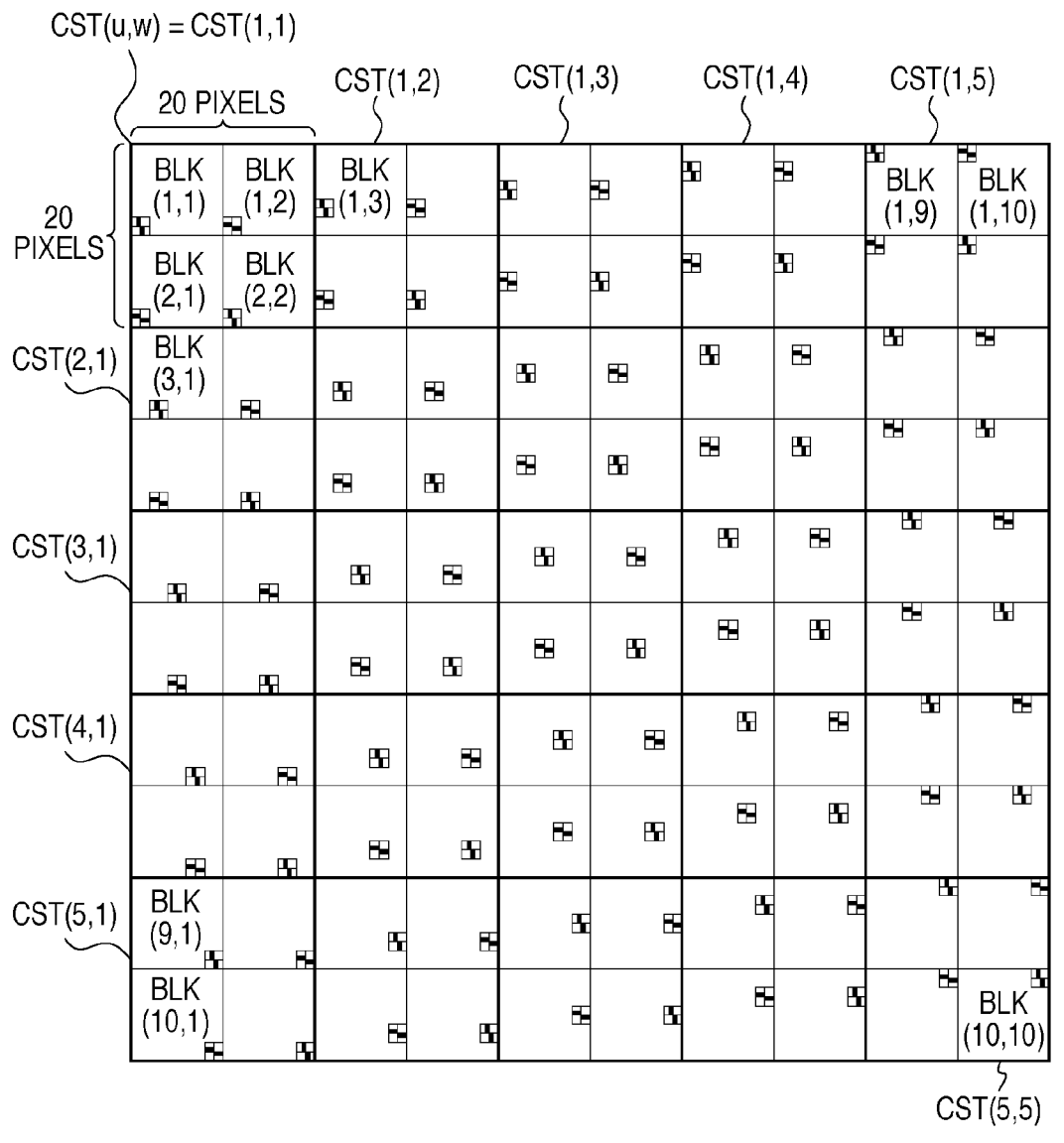
Figure 9:
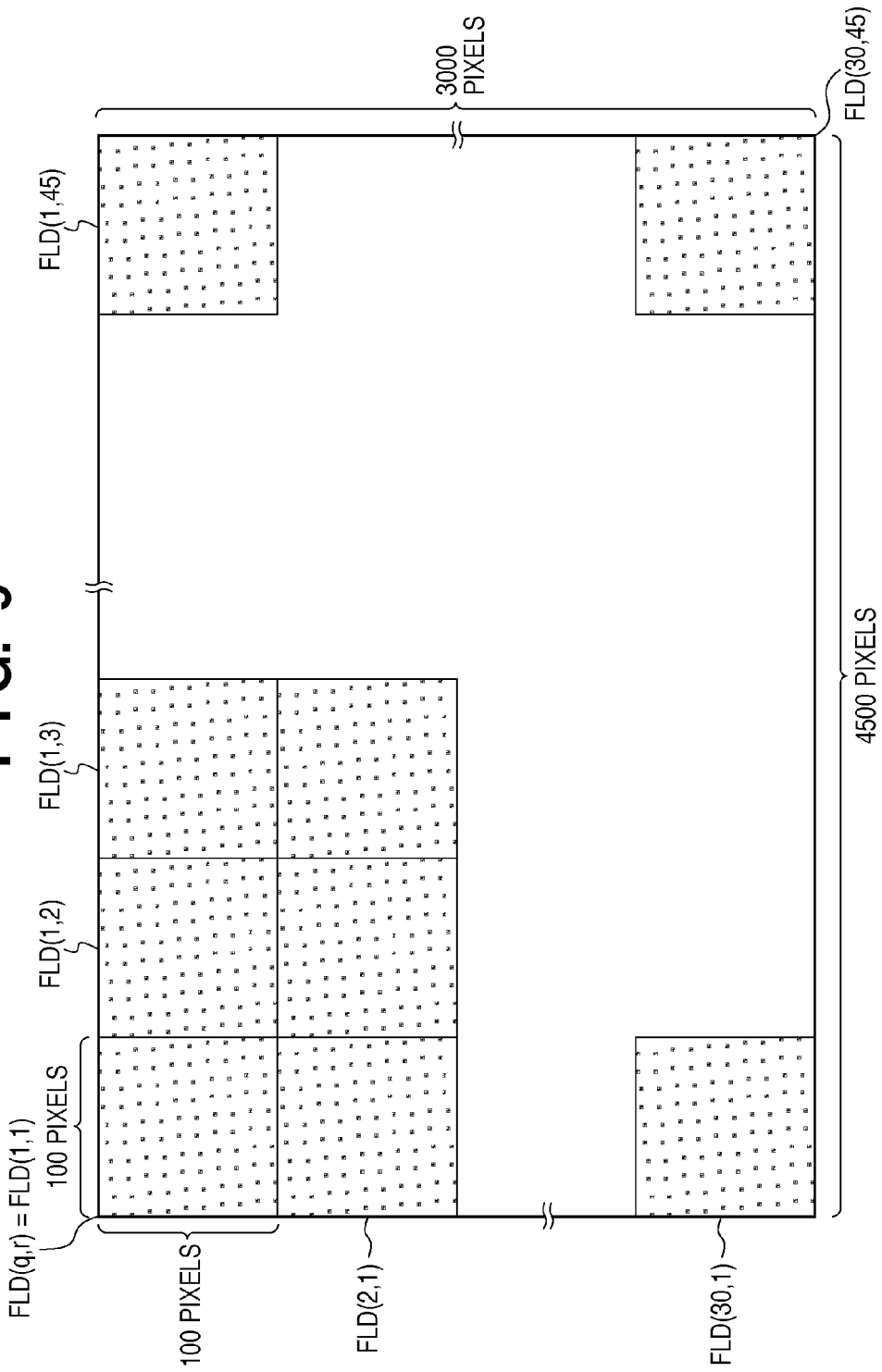
FIG. 9 is a diagram illustrating the pixel array in all regions of the image sensor shown in FIG. 1.

FIGS. 7 to 9 are diagrams for describing arrangement rules for the capturing pixels and focus detection pixels shown in FIGS. 4A to 6B. FIG. 7 is a diagram for describing an arrangement rule for the minimum unit in the case in which focus detection pixels are arranged discretely among the capturing pixels.

In FIG. 7, a square region of 10 rows×10 columns=100 pixels is defined as a block. In an upper left block BLKH(1,1), the lower leftmost R pixel and B pixel have been replaced with a set of focus detection pixels SHA and SHB that perform pupil division in the horizontal direction. In a block BLKV(1,2) adjacent on the right of the block BLKH(1,1), the lower leftmost R pixel and B pixel have likewise been replaced with a set of focus detection pixels SVC and SVD that perform pupil division in the vertical direction. Also, the pixel array of a block BLKV(2,1) adjacent below the first block BLKH(1,1) is the same as the pixel array of the block BLKV(1,2). The pixel array of a block BLKH(2,2) adjacent on the right of the block BLKV(2,1) is the same as the pixel array of the leading block BLKH(1,1). This arrangement rule can be generalized as follows: a block BLK(i,j) is provided with focus detection pixels for horizontal pupil division if i+j is an even number, and provided with focus detection pixels for vertical pupil division if i+j is an odd number. Also, 2×2=4 blocks in FIG. 7, that is to say, a region of 20 rows×20 columns=400 pixels is defined as a cluster, which is a higher order array unit for blocks.

FIG. 8 is a diagram for describing an arrangement rule using the cluster as a unit. In FIG. 8, the upper leftmost cluster configured by 20 rows×20 columns=400 pixels is considered to be CST(u,w)=CST(1,1). In the cluster CST(1,1), the lower leftmost R pixel and B pixel of each block has been replaced with the focus detection pixels SHA and SHB, or SVC and SVD. In a cluster CST(1,2) adjacent on the right of the cluster CST(1,1), the focus detection pixels in each block have been arranged at positions that are shifted two pixels upward relative to the cluster CST(1,1). Also, in a cluster CST(2,1) adjacent below the first cluster CST(1,1), the focus detection pixels in each block have been arranged at positions that are shifted two pixels to the right relative to the cluster CST(1,1). Applying the above-described rule obtains the arrangement shown in FIG. 8.

When generalized, this arrangement rule is as described below. Note that the four pixels including G pixels shown in FIG. 5 or 6 are considered to be one unit (pair), and the coordinates of the focus detection pixels are determined by the coordinates of the upper leftmost pixel among the four pixels. Also, for the coordinates in each block, the upper left is considered to be (1,1), and the down direction and right direction are considered to be positive. In a cluster CST(u,w), the horizontal coordinates of the focus detection pixel pair in each blocks are 2×u−1, and the vertical coordinates thereof are 11−2×w. Also, 5×5=25 clusters in FIG. 8, that is to say, a region of 100 rows×100 columns=10000 pixels is defined as a field, which is the higher order array unit for clusters.

FIG. 9 is a diagram for describing an arrangement rule using the field as a unit. In FIG. 9, the upper leftmost field configured by 100 rows×100 columns=10000 pixels is considered to be FLD(q,r)=FLD(1,1). Also, in the present embodiment, the array of all fields FLD(q,r) is similar to the array of the leading field FLD(1,1). In view of this, when 45 fields FLD(q,r) are arranged in the horizontal direction and 30 fields FLD(q,r) are arranged in the vertical direction, the capturing region of 3000 rows×4500 columns=13.5 million pixels is constituted by 1350 fields FLD(q,r). Thus, the focus detection pixels can be distributed uniformly throughout the entirety of the capturing region.

Next is a description of a method for performing grouping and signal addition on pixels during focus detection with reference to FIGS. 10 to 13.

Figure 10:
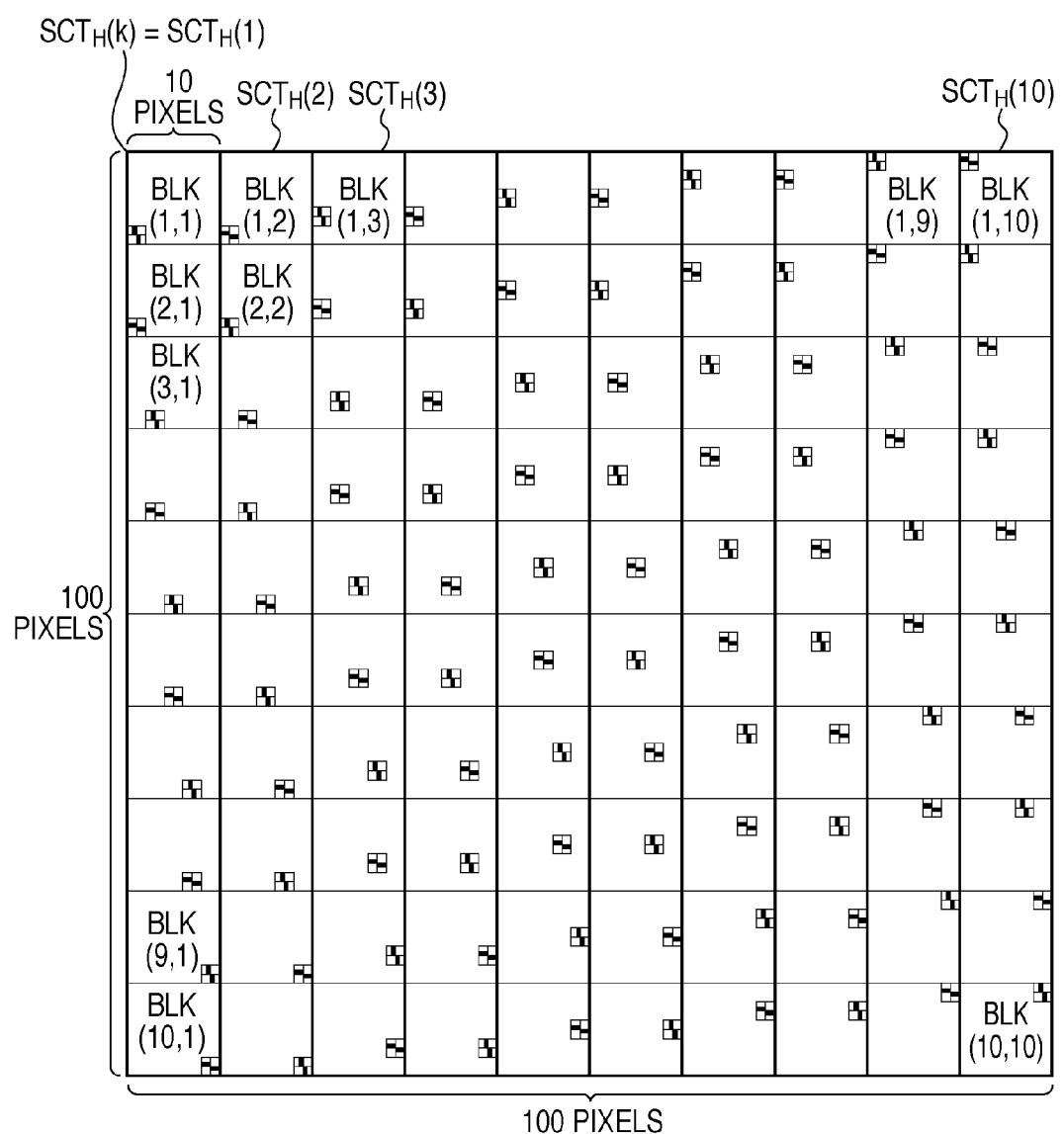
FIG. 10 is a diagram illustrating a pixel grouping method performed in lateral defocus detection.

FIG. 10 is a diagram for describing a pixel grouping method in the case of performing lateral defocus direction focus detection on an object image formed by the photographing optical system. Lateral defocus direction focus detection refers to performing phase difference focus detection with use of the focus detection pixels that are described in FIG. 5 for dividing the exit pupil of the photographing optical system in the lateral direction (horizontal direction or left-right direction).

The pixel array shown in FIG. 10 is the same as the pixel array in FIG. 8, and in the case of performing focus detection, a total of 10 blocks that is one block horizontally and ten blocks vertically is considered to be one group, and this group is defined as a section. A focus detection region is configured by concatenating sections SCTH(k) aligned in the lateral direction. As one example in the present embodiment, a focus detection region is configured by concatenating 10 sections from section SCTH(1) to section SCTH(10). In other words, a focus detection region is a region of 100 rows×100 columns=10000 pixels. This region is the same as a field, and as described with reference to FIG. 9, setting is performed so that the capturing region is constituted by 1350 fixed focus detection regions. Of course there are various setting methods, and a setting method is possible in which variable focus detection regions are set at arbitrary positions in the capturing region by concatenating sections SCTH(k) at arbitrary positions in the capturing region in accordance with the object.

Here, a section includes five pixels SHA that perform pupil division on one side in the lateral direction and five pixels SHB that perform pupil division on the other side. In view of this, in the present embodiment, the output of the five pixels SHA is added together and considered to be a signal for one pixel, thus obtaining an AF pixel of one image signal (referred to as the A image) for phase difference calculation. Similarly, the output of the five pixels SHB is added together and considered to be a signal for one pixel, thus obtaining an AF pixel of the other image signal (referred to as the B image) for phase difference calculation.

Figure 11:
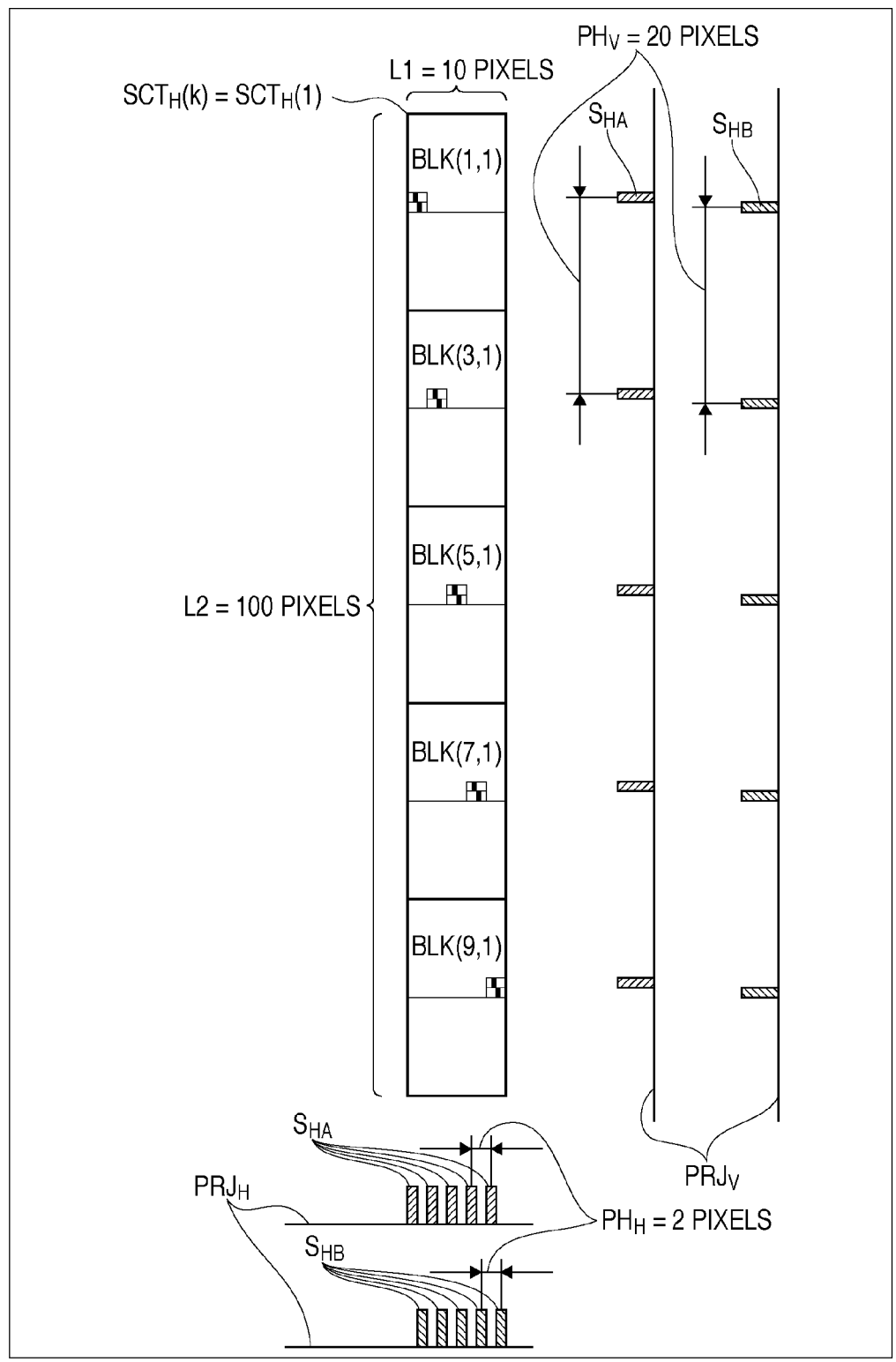
FIG. 11 is a diagram illustrating image sampling characteristics in lateral defocus detection.

FIG. 11 is a diagram for describing the ability to capture an object image in a section. FIG. 11 is a cut-away view of the section SCTH(1) at the left edge in FIG. 10. Horizontal lines PRJH indicated at the bottom are first projection lines extending in the pupil division direction of the focus detection pixels SHA and SHB, and vertical lines PRJV indicated on the right are second projection lines extending in the direction orthogonal to the pupil division direction. Here, the output of all pixels SHA in a section is added together, and the same addition is performed for the pixels SHB as well. In view of this, it can be seen that in the case of considering an AF pixel to be a section, when the light receiving units included in the AF pixel are projected along the projection lines PRJH in the pupil division direction, the pixels SHA and SHB are densely aligned alternately. Here, P1=PHH=2 (the unit is a pixel), where P1 is the array pitch of the pixels SHA on the projection lines PRJH in the pupil division direction. When this is expressed using a spatial frequency F1 instead of a pitch, the result is F1=0.5 (the unit is pixel/pixel). Likewise, the array pitch of the pixels SHB on the projection lines PRJH is also P1=2 (the unit is a pixel), and in spatial frequency notation, the result is F1=0.5 (the unit is pixel/pixel).

On the other hand, when the light receiving units included in an AF pixel are projected along the projection lines PRJV in the direction orthogonal to the pupil division direction, the pixels SHA and SHB are aligned sparsely. Here, P2=PHV=20

(the unit is a pixel), where P2 is the array pitch of the pixels SHA on the projection lines PRJV. When this is expressed using a spatial frequency F2 instead of a pitch, the result is F2=0.05 (the unit is pixel/pixel). Likewise, the array pitch of the pixels SHB on the projection lines PRJV is also P2=20 (the unit is a pixel), and in spatial frequency notation, the result is F2=0.05 (the unit is pixel/pixel).

In other words, in an AF pixel of the present embodiment, in the distribution characteristics before grouping, the pitch in the pupil division direction and the pitch in the direction orthogonal thereto in the arrangement are equal. However, by causing the grouping shape to be a rectangle when performing grouping, the sampling error in the pupil division direction is reduced. Specifically, a maximum dimension L1 in the pupil division direction of a section is ten pixels, and a maximum dimension L2 in the direction orthogonal to the pupil division direction is 100 pixels. In other words, by causing the section dimensions to satisfy the relationship L1<L2, the sampling frequency F1 in the pupil division direction is caused to be a high frequency (dense), and the sampling frequency F2 in the direction orthogonal to the pupil division direction is caused to be a low frequency (sparse).

Figure 12:
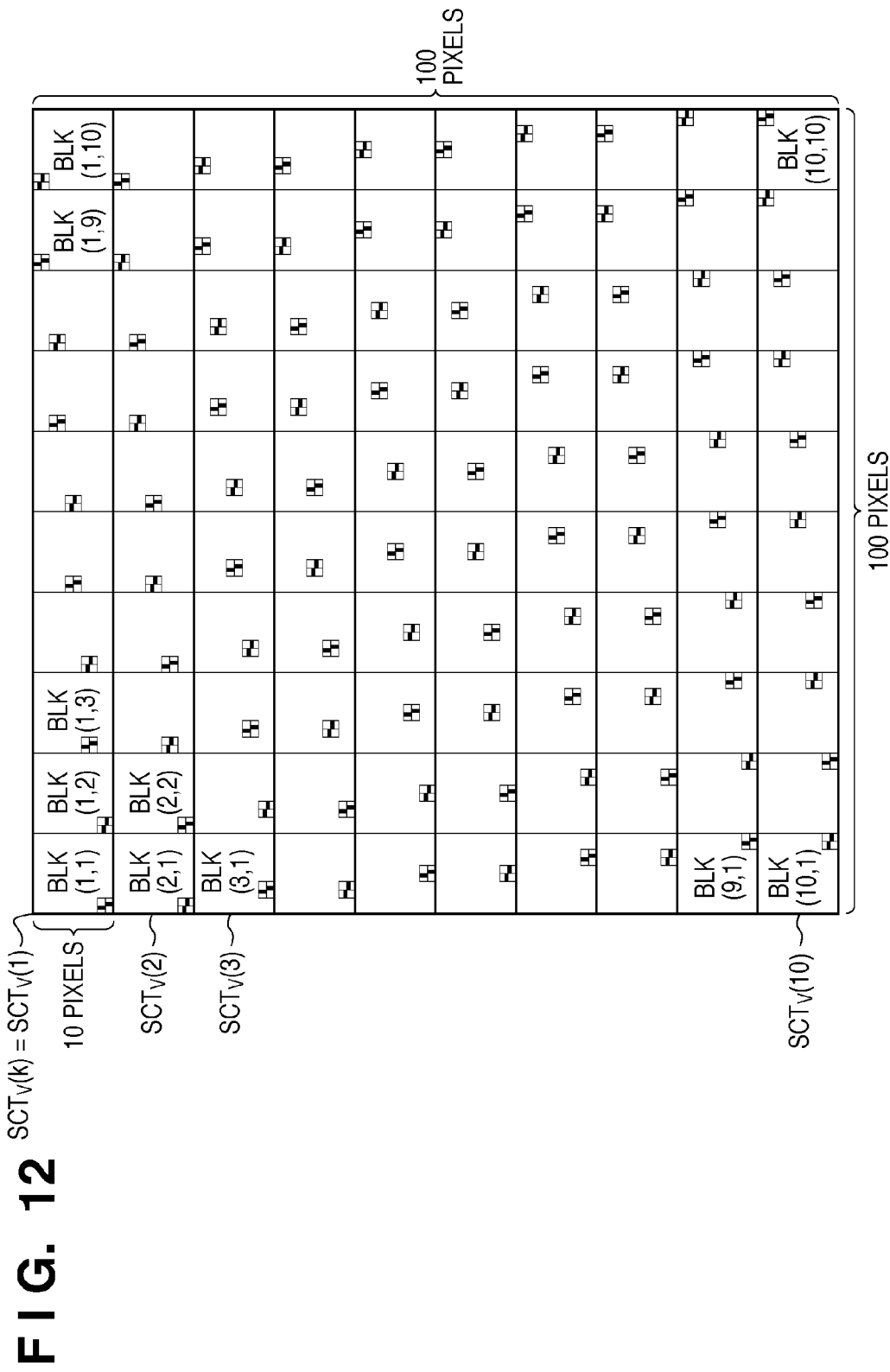
FIG. 12 is a diagram illustrating a pixel grouping method performed in longitudinal defocus detection.

FIG. 12 is a diagram for describing a pixel grouping method in the case of performing longitudinal defocus direction focus detection on an object image formed by the photographing optical system.

Longitudinal defocus direction focus detection refers to performing phase difference focus detection with use of the focus detection pixels that are described in FIG. 6 for dividing the exit pupil of the photographing optical system in the longitudinal direction (vertical direction or up-down direction). In other words, FIG. 12 corresponds to a 90-degree rotation of FIG. 10.

The pixel array shown in FIG. 12 is the same as the pixel array in FIG. 8, and in the case of performing focus detection, a total of ten blocks that is ten blocks horizontally and one block vertically is considered to be one group, and this group is defined as a section. A focus detection region is configured by concatenating sections SCTV(k) aligned in the longitudinal direction. As one example in the present embodiment, a focus detection region is configured by concatenating 10 sections from section SCTV(1) to section SCTV(10). In other words, a focus detection region is a region of 100 rows×100 columns=10000 pixels. This region is the same as a field, and as described with reference to FIG. 9, setting is performed so that the capturing region is constituted by 1350 fixed focus detection regions. Of course there are various setting methods, and a setting method is possible in which variable focus detection regions are set at arbitrary positions in the capturing region by concatenating sections SCTV(k) at arbitrary positions in the capturing region in accordance with the object.

Here, a section includes five pixels SVC that perform pupil division on one side in the longitudinal direction and five pixels SVD that perform pupil division on the other side. In view of this, in the present embodiment, the output of the five pixels SVC is added together and considered to be a signal for one pixel, thus obtaining an AF pixel of one image signal (referred to as the C image) for phase difference calculation. Similarly, the output of the five pixels SVD is added together and considered to be a signal for one pixel, thus obtaining an AF pixel of the other image signal (referred to as the D image) for phase difference calculation.

Figure 13:
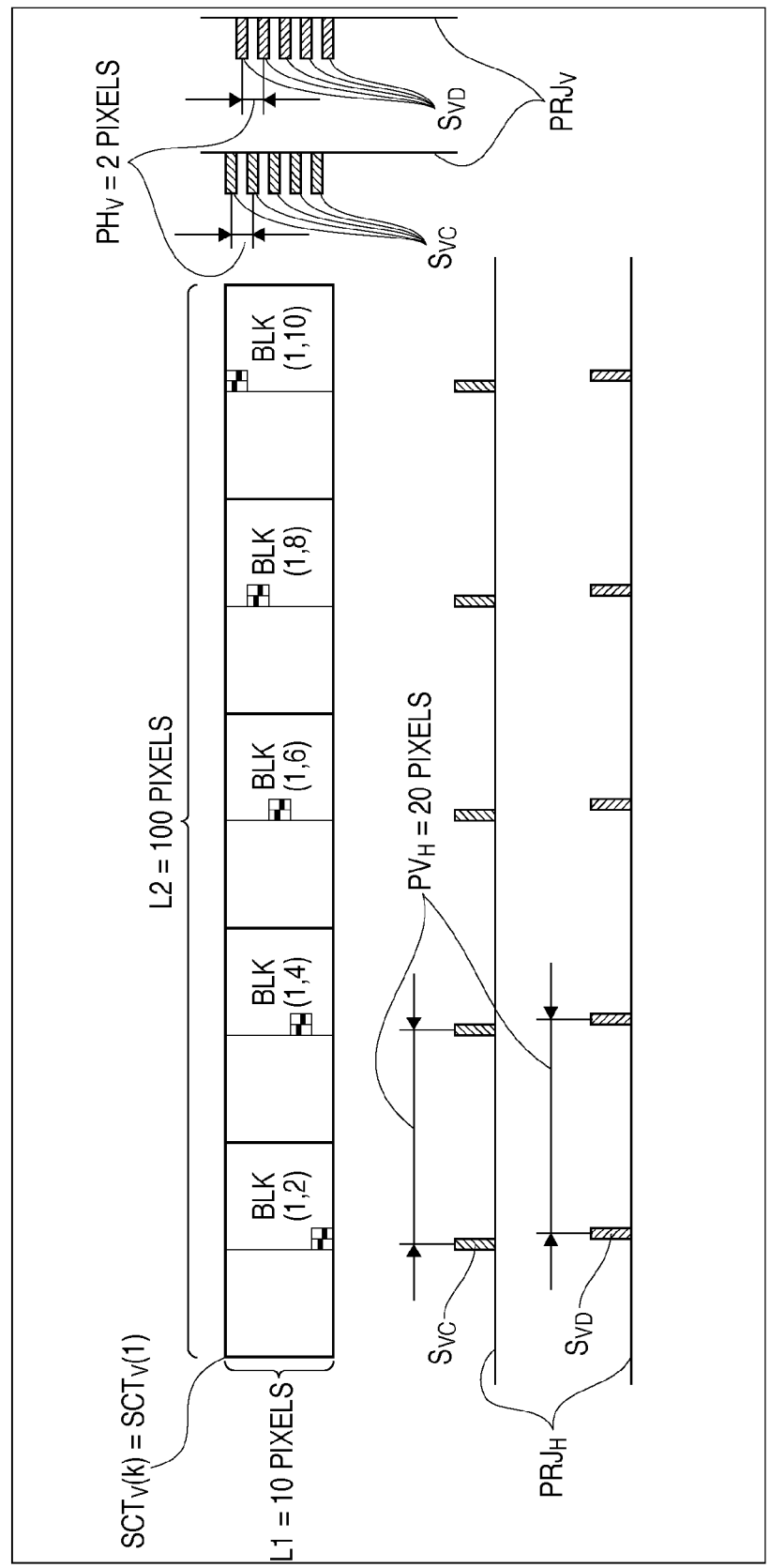
FIG. 13 is a diagram illustrating image sampling characteristics in longitudinal defocus detection.

FIG. 13 is a diagram for describing the ability to capture an object image in a section, and FIG. 13 is equivalent to a 90-degree rotation of FIG. 11. FIG. 13 is a cut-away view of the section SCTV(1) at the top edge in FIG. 12. Vertical lines PRJV indicated on the right are third projection lines extending in the pupil division direction of the focus detection pixels SVC and SVD, and horizontal lines PRJH indicated at the bottom are fourth projection lines extending in the direction orthogonal to the pupil division direction. In FIG. 12 as well, the output of all pixels SVC in a section is added together, and the same addition is performed for the pixels SVD as well. In view of this, it can be seen that in the case of considering an AF pixel to be a section, when the light receiving units included in the AF pixel are projected along the projection lines PRJV in the pupil division direction, the pixels SVC and SVD are densely aligned alternately. Here, P1=PVV=2 (the unit is a pixel), where P1 is the array pitch of the pixels SVC on the projection lines PRJV in the pupil division direction. When this is expressed using a spatial frequency F1 instead of a pitch, the result is F1=0.5 (the unit is pixel/pixel). Likewise, the array pitch of the pixels SVD on the projection lines PRJV is also P1=2 (the unit is a pixel), and in spatial frequency notation, the result is F1=0.5 (the unit is pixel/pixel).

On the other hand, when the light receiving units included in an AF pixel are projected along the projection lines PRJH in the direction orthogonal to the pupil division direction, the pixels SVC and SVD are aligned sparsely. Here, P2=PVH=20 (the unit is a pixel), where P2 is the array pitch of the pixels SVC on the projection lines PRJH. When this is expressed using a spatial frequency F2 instead of a pitch, the result is F2=0.05 (the unit is pixel/pixel). Likewise, the array pitch of the pixels SVD on the projection lines PRJH is also P2=20 (the unit is a pixel), and in spatial frequency notation, the result is F2=0.05 (the unit is pixel/pixel).

As described above, when the sampling characteristics of the AF pixel in FIG. 13 are considered using the pupil division direction as the reference, these characteristics are similar to the characteristics shown in FIG. 11, that is to say, F1>F2. This is because in the section shown in FIG. 13 as well, the section dimension L1 in the pupil division direction and the dimension L2 in the direction orthogonal thereto satisfy the relationship L1<L2. Accordingly, luminance information in the pupil division direction can be accurately detected even for an object having a high spatial frequency, and it is possible to improve the S/N ratio of a focus detection signal by performing addition on a plurality of pixels even when the luminance of the object is low.

Figure 14:
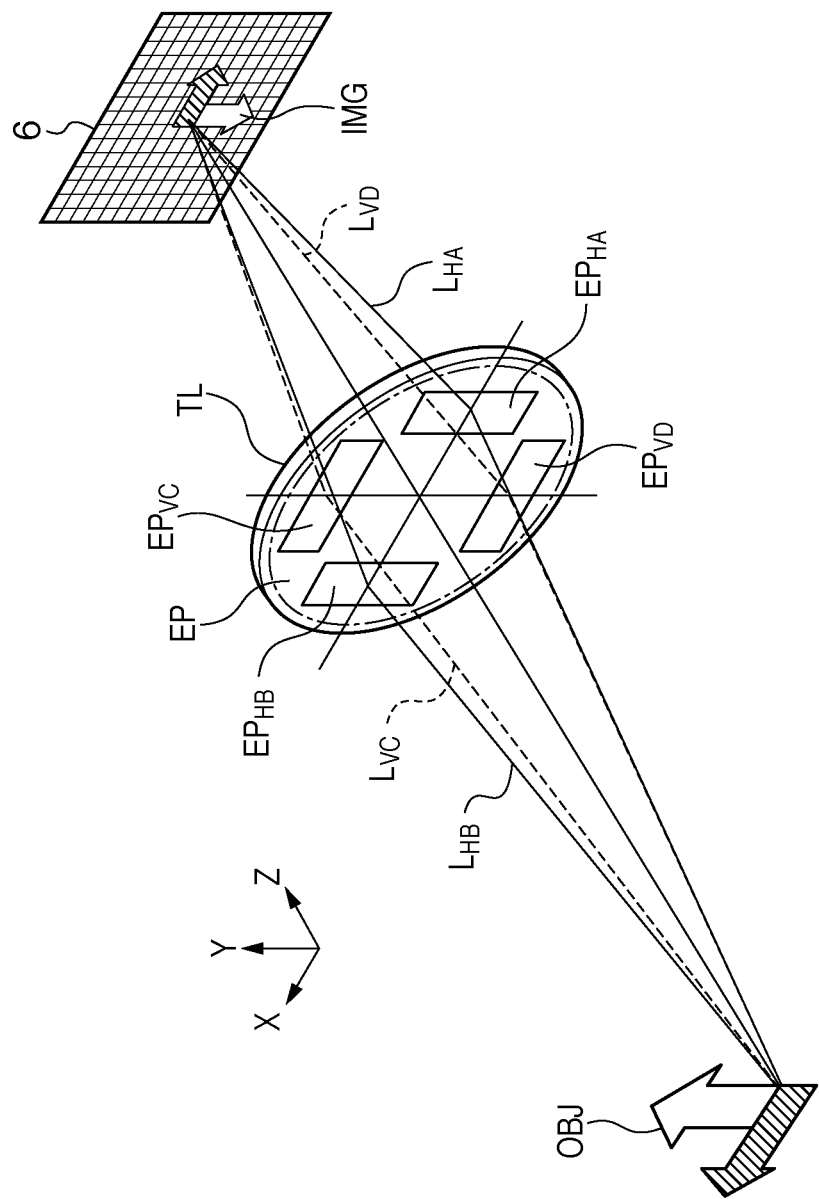
FIG. 14 is a conceptual diagram for describing states of pupil division in the image sensor shown in FIG. 1.

FIG. 14 is a diagram for conceptually describing the pupil division function of the image sensor in the present embodiment.

In FIG. 14, the reference character OBJ denotes the object, and the reference character IMG denotes the object image. As described with reference to FIG. 4, the capturing pixels receive light beams that have passed through all regions of the exit pupil EP of the photographing optical system TL. On the other hand, as described with reference to FIGS. 5 and 6, the focus detection pixels have a pupil division function. Specifically, the pixel SHA in FIG. 5 receives a light beam LHA that has passed through the pupil on the left side when viewing the lens posterior from the image sensing plane, that is to say, the light beam that has passed through the pupil EPHA shown in FIG. 14. Similarly, the pixels SHB, SVC, and SVD respectively receive light beams LHB, LHC, and LHD that have passed through the pupils EPHB, EPVC, and EPVD respectively. Also, since the focus detection pixels are distributed throughout all regions of the image sensor 6 as described with reference to FIG. 9, focus detection is possible in all regions of the capturing region.

Figure 15:
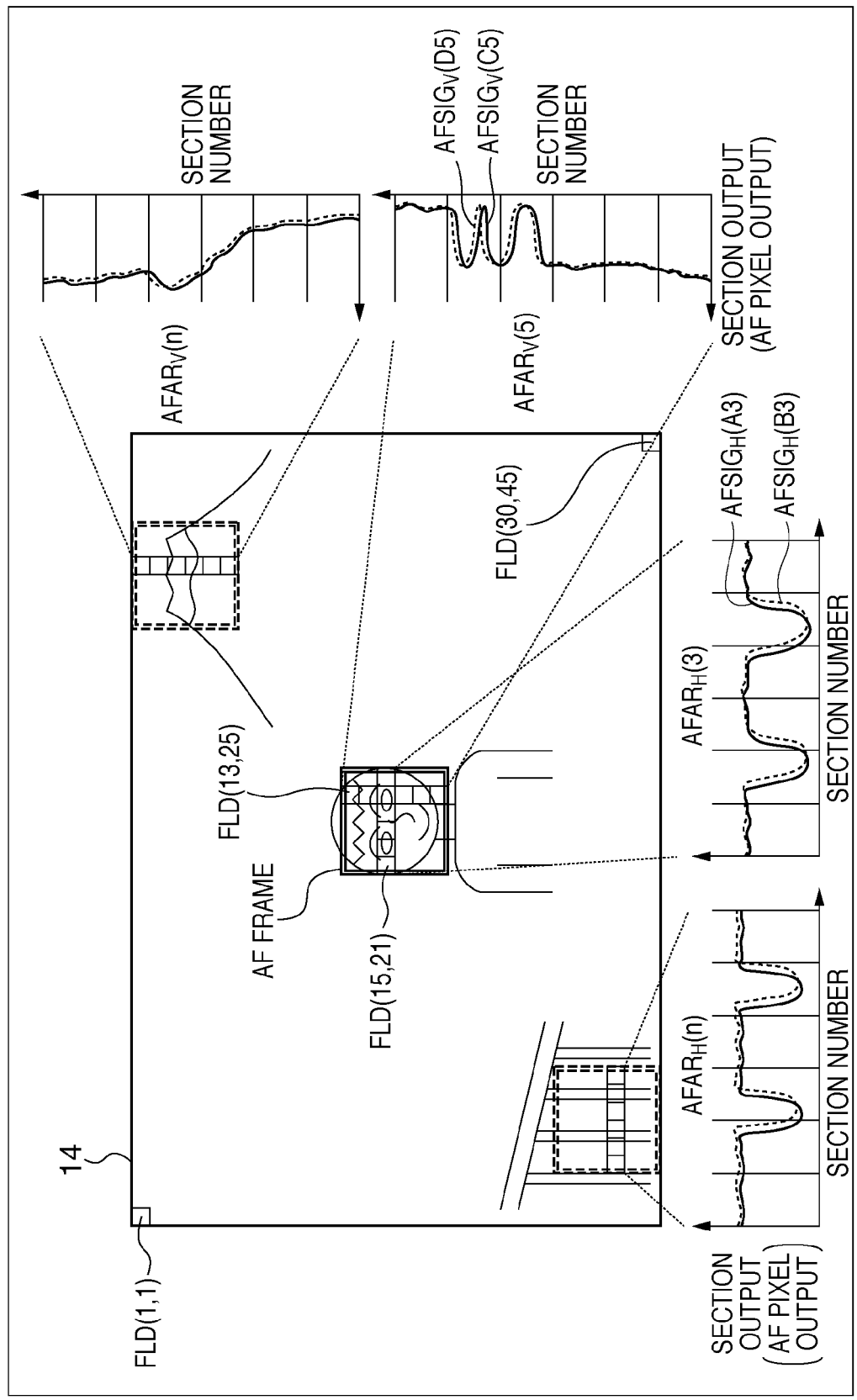
FIG. 15 is a diagram illustrating AF operations during live-viewing.

FIG. 15 is a diagram illustrating AF operations during live-viewing, and FIG. 15 shows a state in which an image is being displayed on the liquid crystal monitor 14 during live-viewing.

In an object image formed on the image sensing plane in FIG. 15, a person appears in the center, a fence appears in the foreground in the lower left, and a mountain appears in the background in the upper right, all of which are displayed on the screen. Also, an AF frame is displayed in the center of the screen. As one example in the present embodiment, the size of the AF frame has been set to be six fields laterally, and six fields longitudinally. Furthermore, the AF frame can be moved to an arbitrary position in the capturing region in accordance with an input signal from the multicontroller 33. As one example in the present embodiment, the unit of movement of the AF frame is one field. Of course there are various movement amounts, and the unit may be one section or one pixel.

First is a description of image sensing plane phase difference AF.

Among the focus detection pixels, the lateral defocus detection pixel pair SHA and SHB, and the longitudinal defocus detection pixel pair SVC and SVD are arranged densely and evenly throughout the entire capturing region as shown in FIG. 9. In lateral defocus detection, AF pixel signals for phase difference calculation are grouped as shown in FIGS. 10 and 11. Also, in longitudinal defocus detection, AF pixel signals for phase difference calculation are grouped as shown in FIGS. 12 and 13. Accordingly, it is possible to set focus detection regions for lateral defocus detection and longitudinal defocus detection at arbitrary positions in the capturing region. As described above, as an example in the present embodiment, a focus detection region is set to be the same region as a field.

In FIG. 15, a person's face exists in the center of the screen. If the existence of the face has been detected by heretofore known facial recognition technology, an AF frame is displayed in the portion detected to be the face region, and focus detection is performed in the AF frame. Firstly, AF frame regions AFARH(1) to AFARH(6) that are each a concatenation of focus detection regions for lateral defocus detection are set, and AF frame regions AFARV(1) to AFARV(6) that are each a concatenation of focus detection regions for longitudinal defocus detected are set.

The AF frame region AFARH(1) for lateral defocus detection is a concatenation of the six fields that are focus detection regions in the first row from the top in the AF frame, that is to say, from a field FLD(13,21) to a field FLD(13,26). The AF frame region AFARH(2) is a concatenation of fields that are the focus detection regions in the second row from the top in the AF frame, that is to say, from a field FLD(14,21) to a field FLD(14,26). The AF frame region AFARH(3) is a concatenation of fields that are focus detection regions in the third row from the top in the AF frame, that is to say, from a field FLD(15,21) to a field FLD(15,26). The AF frame region AFARH(4) is a concatenation of fields that are focus detection regions in the fourth row from the top in the AF frame, that is to say, from a field FLD(16,21) to a field FLD(16,26). The AF frame region AFARH(5) is a concatenation of fields that are focus detection regions in the fifth row from the top in the AF frame, that is to say, from a field FLD(17,21) to a field FLD(17,26). The AF frame region AFARH(6) is a concatenation of fields that are focus detection regions in the sixth row from the top in the AF frame, that is to say, from a field FLD(18,21) to a field FLD(18,26).

The AF frame region AFARV(1) for longitudinal defocus detection is a concatenation of six fields that are focus detection regions in the first column from the left in the AF frame, that is to say, from a field FLD(13,21) to a field FLD(18,21). The AF frame region AFARV(2) is a concatenation of fields that are focus detection regions in the second column from the left in the AF frame, that is to say, from a field FLD(13,22) to a field FLD(18,22). The AF frame region AFARV(3) is a concatenation of fields that are focus detection regions in the third column from the left in the AF frame, that is to say, from a field FLD(13,23) to a field FLD(18,23). The AF frame region AFARV(4) is a concatenation of fields that are focus detection regions in the fourth column from the left in the AF frame, that is to say, from a field FLD(13,24) to a field FLD(18,24). The AF frame region AFARV(5) is a concatenation of fields that are focus detection regions in the fifth column from the left in the AF frame, that is to say, from a field FLD(13,25) to a field FLD(18,25). The AF frame region AFARV(6) is a concatenation of fields that are focus detection regions in the sixth column from the left in the AF frame, that is to say, from a field FLD(13,26) to a field FLD(18,26).

In FIG. 15, the regions AFARH(3) and AFARV(5) are each displayed as one of the AF frame regions for lateral defocus detection and longitudinal defocus detection, and the other five regions have been omitted from FIG. 15. AFSIGH(A3) is an A image signal for phase difference detection that has been obtained by adding together the five focus detection pixels SHA included in the sections of the AF frame region AFARH (3), and then concatenating the 60 sections (=10 sections per 1 focus detection region×AF frame width of 6 fields). Similarly, AFSIGH(B3) is a B image signal for phase difference detection that has been obtained by adding together the five focus detection pixels SHB in the sections, and then concatenating the results of the 60 sections. An amount of defocus for the object is obtained by calculating a relative lateral amount of defocus between the A image signal AFSIGH(A3) and the B image signal AFSIGH(B3) with use of a known correlation operation. Similarly, an amount of defocus for the object is obtained for each of the AF frame regions AFARH (1) to AFARH(6).

The same follows for the AF frame region AFARV(5) as well. Specifically, AFSIGV(C5) is a C image signal for phase difference detection that has been obtained by adding together the five focus detection pixels SVC included in the sections, and then concatenating the 60 sections (=10 sections per 1 focus detection region×AF frame height of 6 fields). Also, AFSIGV(D5) is a D image signal for phase difference detection that has been obtained by adding together the five focus detection pixels SVD in the sections, and then concatenating the results of the 60 sections. An amount of defocus for the object is obtained by calculating a relative longitudinal amount of defocus between the C image signal AFSIGV(C5) and the D image signal AFSIGV(D5) with use of a known correlation operation. Similarly, an amount of defocus for the object is obtained for each of the AF frame regions AFARV(1) to AFARV(6).

Then, the amount of defocus in the AF frame is obtained by comparing a total of 12 amounts of defocus that have been detected for the lateral defocus and longitudinal defocus AF frame regions and utilizing a value that is highly reliable. Here, reliability refers to the degree of coincidence between two images, and in general, the reliability of a focus detection result is high if the degree of coincidence between two images is good. In view of this, if there are focus detection results for multiple focus detection regions, information that is highly reliable is used with priority. Also, instead of using reliability, the amount of defocus in the AF frame may be determined by using a method such as employing an average value of the total of 12 amounts of defocus, or employing a closest value among the 12 amounts of defocus.

In the above description, the amount of defocus of the AF frame region is obtained from image signals that are a concatenation of all sections (60 sections) in the AF frame region.

However, the amount of defocus in the AF frame region can be obtained by a method of, for example, obtaining the amount of defocus for each of six focus detection regions constituting the AF frame region, and employing a highly reliable value or closest value among the results, or employing an average value of the results. Also, the amount of defocus of the AF frame region can be obtained by a method of, for example, obtaining the amount of defocus for each of the 36 focus detection regions in the AF frame without setting AF frame regions, and then employing a highly reliable value or closest value among the results, or employing an average value of the results.

Meanwhile, when the AF frame has been moved to the fence portion in the lower left part of the screen, the amount of defocus of the object can be detected by re-setting the AF frame regions for lateral defocus detection and longitudinal defocus detection in the same way. However, since the main part of the fence portion is a vertical line component (i.e., the fence portion has a horizontal luminance distribution), it can be determined that the object is suited for lateral defocus detection. For this reason, the amount of defocus of the object can be obtained by setting only the AF frame regions AFARH(n) for lateral defocus detection, and calculating the lateral amount of defocus from the A image signal and the B image signal in the same way as with the AF frame region AFARH(3).

The following describes obtaining an amount of defocus based on the assumption of setting AF frame regions. However, it is possible to, without setting the AF frame regions, calculate the lateral amount of defocus in each focus detection region from the A image signal and the B image signal, and obtain the amount of defocus of the object based on highly reliable information from among the focus detection results for the focus detection regions. In other words, at the same time as obtaining an amount of defocus of a face portion of a person in the center of the screen that has been determined to be the main object by facial recognition, it is possible to obtain an amount of defocus of another object (here, the fence in the lower left part of the screen) in the capturing region.

When the AF frame has been moved to the mountain portion in the upper right part of the screen, the amount of defocus of the object can be detected by setting the AF frame regions for lateral defocus detection and longitudinal defocus detection in the same way as is described above. However, since the main part of the mountain portion is a horizontal line component (i.e., the mountain portion has a vertical luminance distribution), it can be determined that the object is suited for longitudinal defocus detection. For this reason, the amount of defocus of the object can be obtained by setting only the AF frame regions AFARV(n) for longitudinal defocus detection, and calculating the lateral amount of defocus from the C image signal and the D image signal in the same way as with the AF frame region AFARV(5).

The above described obtaining an amount of defocus based on the assumption of setting AF frame regions. However, it is possible to, without setting the AF frame regions, calculate the lateral amount of defocus in each focus detection region from the C image signal and the D image signal, and obtain the amount of defocus of the object based on highly reliable information from among the focus detection results for the focus detection regions. In other words, at the same time as obtaining an amount of defocus of a face portion of a person in the center of the screen that has been determined to be the main object by facial recognition, it is possible to obtain an amount of defocus of another object (here, the mountain in the upper right part of the screen) in the capturing region.

As described above, in the present embodiment, since the focus detection regions for lateral defocus detection and longitudinal defocus detection are set to all regions of the image sensor 6, even when there are various projection positions of the object and various orientations of the luminance distribution, it is possible to perform focus detection by image sensing plane phase difference AF in all regions of the capturing region.

Next is a description of a method for recording photographing information in an image file.

Figure 16:
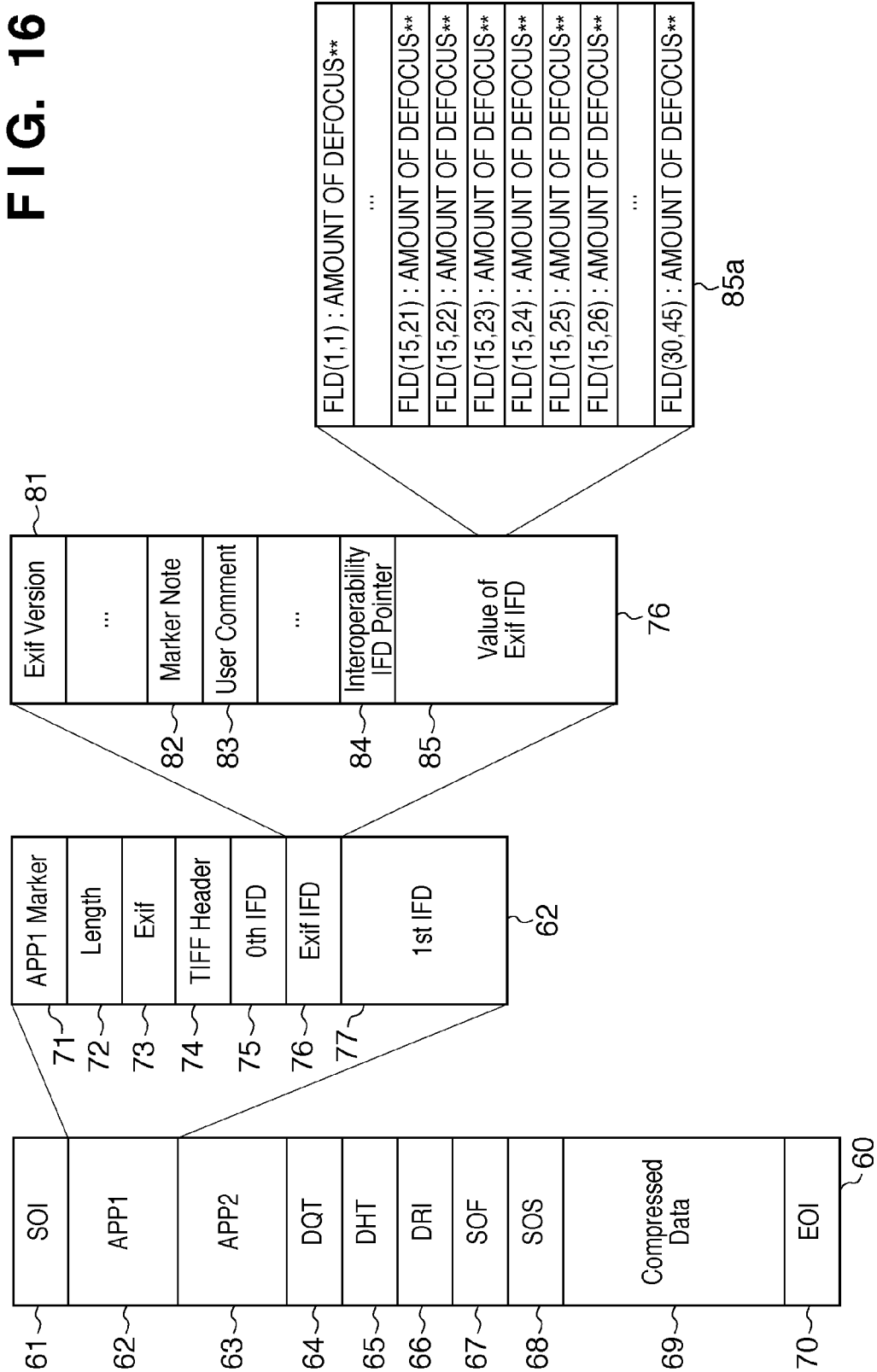
FIG. 16 is a diagram showing the format structure of an Exif compressed image file.

FIG. 16 is a diagram showing the format structure of an Exif compressed image file. Reference character 60 denotes a JPEG compressed image file that is configured by, in order, an SOI marker 61 at the beginning that indicates the start of the file, an application marker segment 1 (APP1) 62 in which Exif attached information is recorded, an application marker segment 2 (APP2) 63 in which Exif extension data is recorded, a quantization table marker segment (DQT) 64, a Huffman table marker segment (DHT) 65, a restart marker segment (DRI) 66, a frame header marker segment (SOF) 67, a scan header marker segment (SOS) 68, compressed image data (Compressed Data) 69, and an EOI marker 70 that indicates the end of the file.

As for the internal structure of the APP1 (62), the APP1 (62) is configured from an APP1 marker 71 at the beginning that indicates being an application region, a Length 72 that indicates the size of the application region, an Exif identification code 73, and an attached information body. The attached information has a TIFF structure including a File Header 74, and the attached information is configured by a 0th IFD 75 in which attached information related to a compressed image (main image) is recorded, an Exif IFD 76 for the recording of attached information specific to Exif in the 0th IFD (attached information recording area), and a 1st IFD 77 in which a thumbnail image is recorded.

Regarding the tag structure of the attribution information recorded in the Exif IFD 76, the attached information is configured by an Exif Version tag 81 at the beginning, a Maker Note tag 82 in which a manufacturer can record individual information, a User Comment tag 83 in which a user can record individual information, a pointer (Interoperability IFD Pointer) 84 pointing to an IFD, and a region (Value of Exif IFD) 85 in which data is actually recorded.

Reference character 85a denotes an example of image sensing plane phase difference AF data that has been recorded, and in this example, an amount of defocus (ranging data) for each focus detection region obtained by image sensing plane phase difference AF is recorded so as to be acquirable. First, the Maker Note tag 82 has recorded therein information indicating which region of the data recording region 85 has the amount of defocus data 85a recorded therein. The amount of defocus data 85a is recorded beginning at the focus detection region in the upper left part of the image sensing plane in FIGS. 9 and 15 (i.e., field FLD(1,1)) and ending at the focus detection region in the lower right part of the image sensing plane (i.e., field (30,45)). Regarding the recording order, the recording begins horizontally from the field FLD(15,21), to the field FLD(15,22), to the field FLD(15,23), to the field FLD(15,24), to the field FLD(15,25), and to the field FLD(15,26), and when the horizontal row has ended, recording is performed in the field that is next in the vertical direction.

Figure 17:
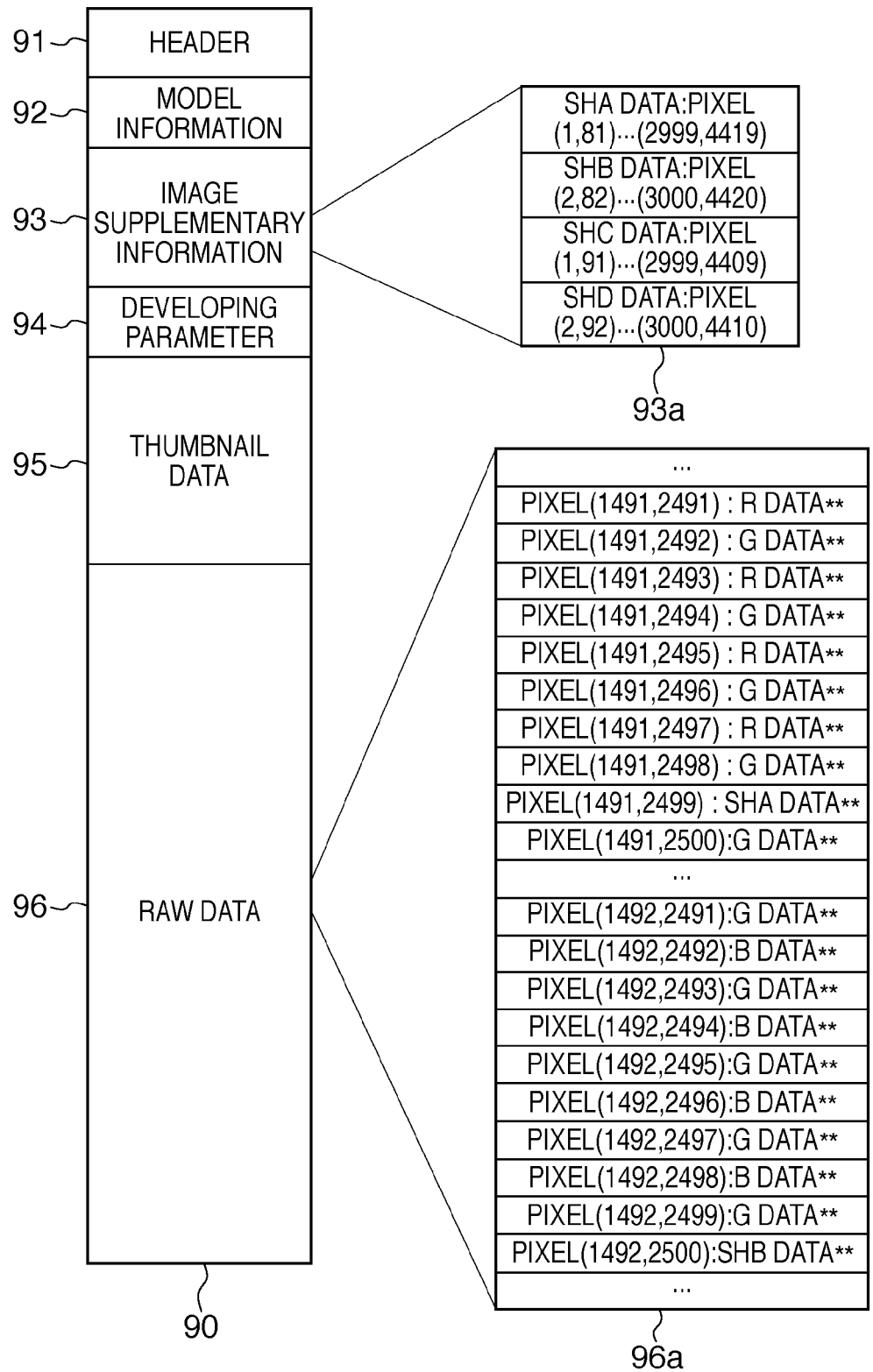
FIG. 17 is a diagram showing the format structure of a RAW data image file.

FIG. 17 is a diagram showing the format structure of a RAW data image file.

Here, RAW data is so-called raw image data in an image format in which an image signal output from the image sensor 6 has only been digitally converted by the A/D converter 41, and various types of image processing such as Y/C separation, white balance correction, γ correction, and compression manipulation have not yet been performed. Accordingly, RAW data is very large in size, and therefore the user has a high degree of freedom in performing image processing at a later time. For this reason, RAW data has the feature of enabling an image captured by the user to be freely adjusted as the user pleases while maintaining high image quality.

Reference character 90 denotes an image file in the RAW data format, and the image file is configured by a header 91 at the beginning, camera model information 92 indicating the camera model used in capturing, image supplementary information 93 in which various types of information can be recorded in conformity with the Exif tag format, developing parameters 94 such as a white balance value and γ value for developing the RAW data, thumbnail data 95, and RAW data 96. Also, the image supplementary information 93 has recorded therein focus detection pixel location information 93a that indicates the locations on the image sensor 6 where the focus detection pixels are arranged.

Reference character 96a denotes an example of RAW data content, and in this example, the data 96a shows a region having focus detection pixels in the lower right corner of the field FLD(15,25), and the output data of each pixel is recorded in the data 96a. Similarly to the data 85a, the recorded data begins with the pixel data in the upper left part of the image sensing plane, and ends with the pixel data in the lower right part. Specifically, the data 96a shows the first and second rows in the block BLK(150,250) in the lower right corner of the field FLD(15,25). In the first row, a pixel (1491, 2491) is an R capturing pixel in which R data is recorded, a pixel (1491,2492) is a G capturing pixel in which G data is recorded, a pixel (1491,2493) is an R capturing pixel in which R data is recorded, a pixel (1491,2494) is a G capturing pixel in which G data is recorded, a pixel (1491,2495) is an R capturing pixel in which R data is recorded, a pixel (1491, 2496) is a G capturing pixel in which G data is recorded, a pixel (1491,2497) is an R capturing pixel in which R data is recorded, a pixel (1491,2498) is a G capturing pixel in which G data is recorded, a pixel (1491,2499) is a focus detection pixel SHA in which SHA data is recorded, and a pixel (1491, 2500) is a G capturing pixel in which G data is recorded. In the second row, a pixel (1492,2491) is a G capturing pixel in which G data is recorded, a pixel (1492,2492) is a B capturing pixel in which B data is recorded, a pixel (1492,2493) is a G capturing pixel in which G data is recorded, a pixel (1492, 2494) is a B capturing pixel in which B data is recorded, a pixel (1492,2495) is a G capturing pixel in which G data is recorded, a pixel (1492,2496) is a B capturing pixel in which B data is recorded, a pixel (1492,2497) is a G capturing pixel in which G data is recorded, a pixel (1492,2498) is a B capturing pixel in which B data is recorded, a pixel (1492, 2499) is a G capturing pixel in which G data is recorded, and a pixel (1492,2500) is a focus detection pixel SHB in which SHB data is recorded. In this way, the data of all pixels is recorded in order beginning with pixels in the horizontal direction, and when the recording of a horizontal row of pixels has ended, the row of pixels that is next in the vertical direction is recorded.

Figure 18:
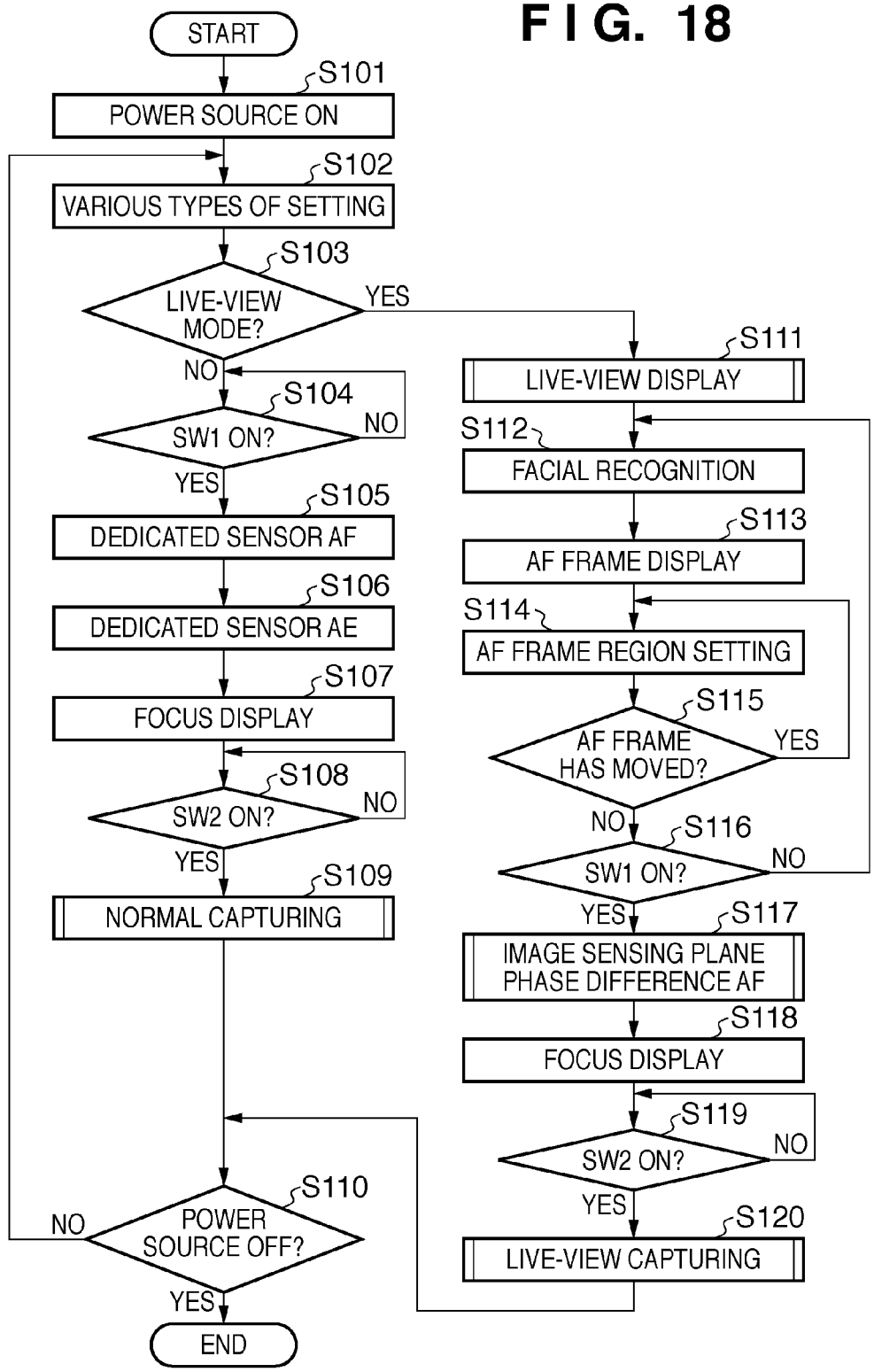
FIG. 18 is a flowchart showing basic operations of the digital camera shown in FIG. 1.

Next is a description of operations of the digital single lens reflex camera according to the present embodiment with reference to the control flow shown in FIGS. 18 to 22. FIG. 18 is a main flow showing basic operations of the digital single lens reflex camera.

In step S101, the user turns ON the power source of the camera by operating the power source button 34. When the power source is turned ON, the MPU 20 checks the operability of the actuators and the image sensor 6 in the camera. Thereafter, the content of the memory and the initialization state of the execution program are checked, and a capturing preparation operation is executed.

In step S102, various types of camera settings are performed by operating various types of buttons. For example, a capturing mode is selected by operating the mode button 31, and settings for the shutter speed, aperture, and captured image recording quality are performed by operating the electronic dial 32.

In step S103, whether or not the live-view mode has been set by the multicontroller 33 is determined, whereby processing proceeds to a live-view mode routine in step S111 if the live-view mode has been set, and processing proceeds to a normal mode routine in step S104 if the live-view mode has not been set.

First is a description of an operation routine in a normal mode (a normal-use mode of a single lens reflex camera in which the user captures images while looking through the finder).

In step S104, whether the release button 30 has been pressed halfway and the SW1 is ON is determined, whereby processing proceeds to step S105 if the SW1 is ON, and if the SW1 is not ON, processing waits until the SW1 becomes ON.

In step S105, a predetermined AF operation using the AF sensor 8 is performed.

In step S106, a predetermined AE operation using the AE sensor 13 is performed.

In step S107, the location of a focus detection point that has been focused on in the finder is displayed on a display apparatus that is not shown.

In step S108, whether the release button 30 has been fully pressed and the SW2 is ON is determined, whereby processing proceeds to step S109 if the SW2 is ON, and if the SW2 is not ON, processing waits until the SW2 becomes ON.

In step S109, a normal capturing routine is executed.

Figure 19:
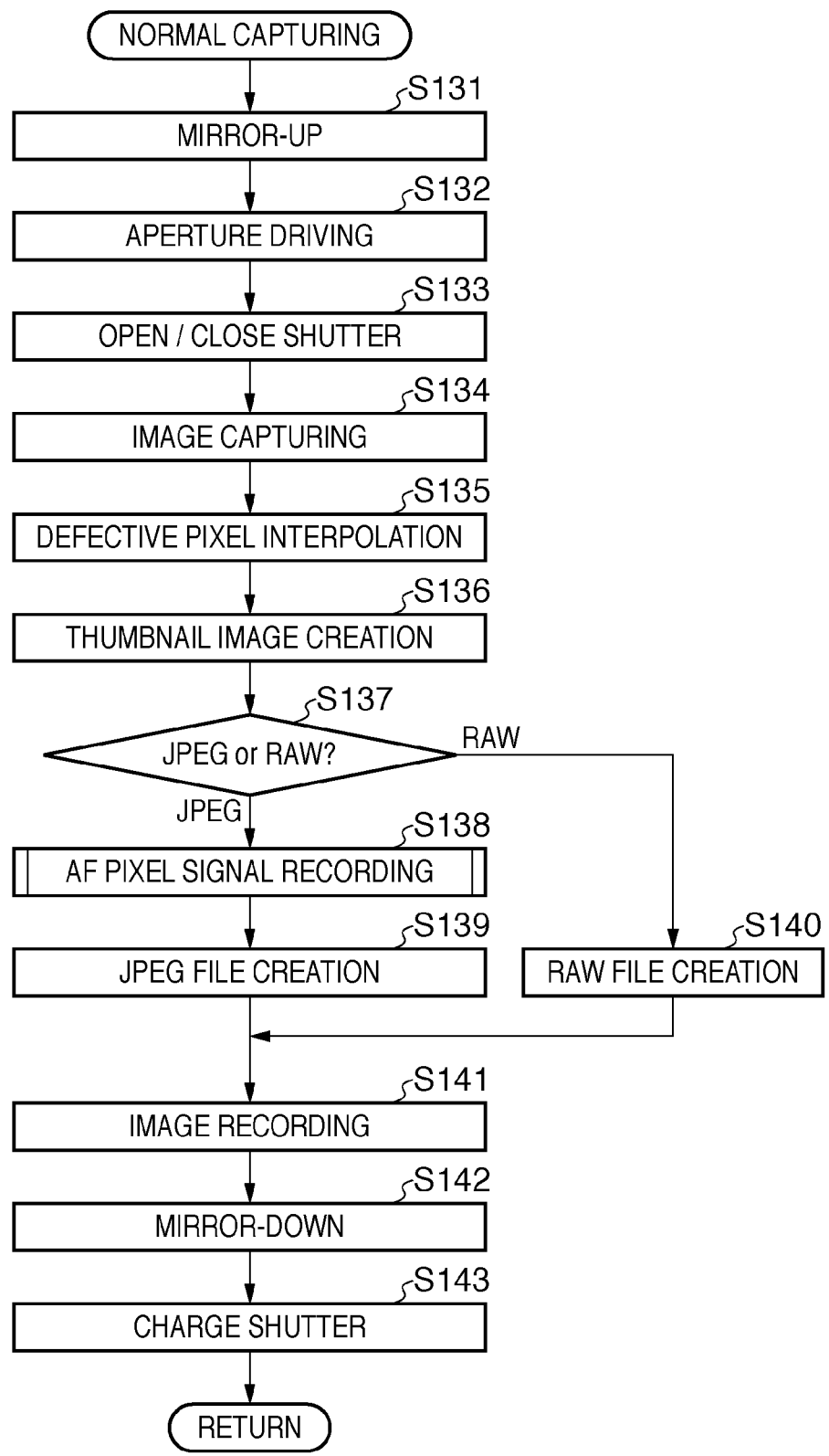
FIG. 19 is a flowchart for describing details of a normal capturing routine shown in FIG. 18.

FIG. 19 is a flowchart showing the normal capturing routine.

In step S131, a mirror driving motor (not shown) is controlled by the motor driving circuit 26, and the main mirror 4 and the sub mirror 7 are caused to retreat from the photographing optical path (mirror-up) (FIG. 2).

In step S132, the aperture (not shown) in the photographing lens 3 is driven by the lens control circuit 23 in accordance with a capturing exposure calculated from the AE result.

In step S133, the shutter 5 is opened and closed by the shutter driving circuit 27.

In step S134, image signals based on light received by the image sensor 6 are read and temporarily recorded in the SDRAM 43 by the memory controller 21. This temporarily recorded data is the captured image data.

In step S135, missing pixel interpolation is performed on the image signals read by the memory controller 21. The reason for this is that, since the output of the focus detection pixels lacks RGB color information for capturing, and such pixels correspond to defective pixels in terms of obtaining an image, image signals are generated by performing interpolation with use of information from surrounding capturing pixels. A defective pixel interpolation image is created based on the generated image signals and original image signals, and the defective pixel interpolation image is temporarily recorded in the SDRAM 43.

In step S136, a thumbnail image is created based on the defective pixel interpolation image and temporarily recorded in the SDRAM 43 by the memory controller 21.

In step S137, whether the captured image recording quality has been selected as JPEG or RAW is determined, whereby processing proceeds to step S138 if JPEG has been selected, and processing proceeds to step S140 if RAW has been selected.

In step S138, an AF pixel signal recording routine is executed.

Figure 20:
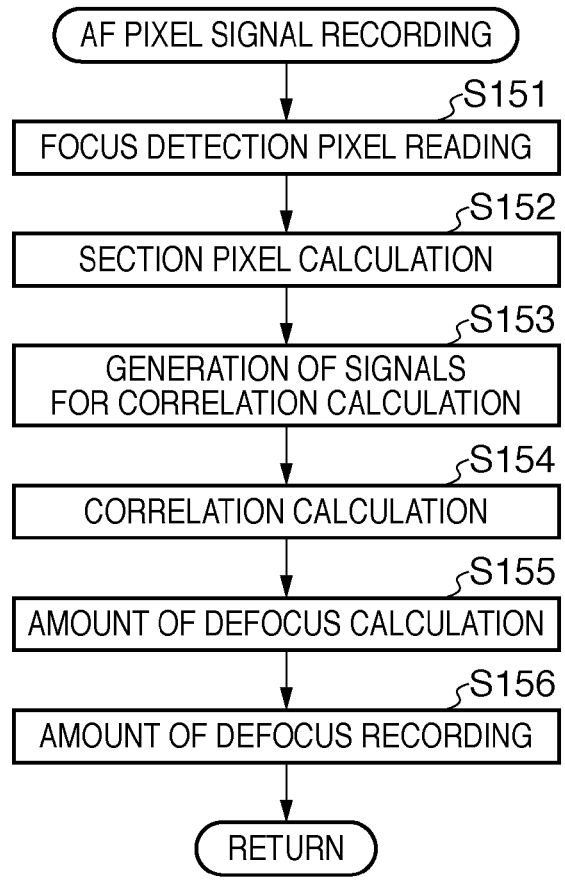
FIG. 20 is a flowchart for describing details of an AF pixel signal recording routine shown in FIG. 18.

FIG. 20 is a flowchart showing the AF pixel signal recording routine.

In step S151, each focus detection pixel included in the focus detection regions is read by the memory controller 21 from the image signals temporarily recorded in the SDRAM 43.

In step S152, the memory controller 21 adds the focus detection pixels in the sections based on the section structure described with reference to FIG. 10 or 12, and obtains an AF pixel signal for each section based on the addition result.

In step S153, two image signals for correlation calculation are generated by the MPU 20 based on the AF pixel signals. In the present embodiment, a signal is generated for each focus detection region shown in FIGS. 10 and 12. As described above, a focus detection region is the same region as a field, and as described with reference to FIG. 9, 1350 pairs of signals are generated for the entire capturing region.

In step S154, the MPU 20 performs a correlation operation on the two obtained images and calculates a relative amount of defocus between the two images.

In step S155, an amount of defocus is calculated by the MPU 20.

In step S156, the calculated amount of defocus is temporarily recorded in the SDRAM 43 by the memory controller 21. The number of amounts of defocus is the same as the number of data pieces for the 1350 focus detection regions. Thereafter, processing returns to step S139 in the normal capturing routine in FIG. 19.

In step S139, image processing such as white balance correction, γ correction, and edge emphasizing are performed on the defective pixel interpolation image by the image processing circuit 44, the resulting image is compressed by the image compression/expansion circuit 45 in accordance with the JPEG format based on the camera setting values, and the resulting compressed image is recorded in the compressed image data unit 69 by the memory controller 21. Also, a thumbnail image is recorded in the 1st IFD 77, and the amount of defocus data 85a is recorded in the data recording area 85. Furthermore, various types of camera settings (e.g., shutter speed, aperture, and lens focal length) are recorded in conformity with Exif rules, and thus the image and various types of data are made into a JPEG file.

In step S140, the image signals temporarily recorded in the SDRAM 43 are recorded in RAW data 96 as shown in 96a by the memory controller 21. Also, the focus detection pixel location information 93a, various types of camera settings (e.g., shutter speed, aperture, and lens focal length), and the like are recorded in the image supplementary information 93 in conformity with Exif rules, and the thumbnail image is recorded in the thumbnail data 95, thus the image and various types of data are made into a RAW file.

In step S141, the image file that is a JPEG file or a RAW file is recorded on the medium 48.

In step S142, the mirror driving motor (not shown) is controlled by the motor driving circuit 26, and the main mirror 4 and the sub mirror 7 that were caused to retreat from the photographing optical path are moved to an observation location (mirror-down) for reflecting and guiding captured light beams to the finder (FIG. 1).

In step S143, the conduction of power to the charge motor (not shown) is controlled by the motor driving circuit 26, and the shutter 5 is charged. Thereafter, processing returns to step S110 in the main routine in FIG. 18.

In step S110, whether the power source of the camera has been turned OFF by the user operating the power source button 34 is determined, whereby processing returns to step S102 and preparation is made for the next instance of capturing if the power source has not been turned OFF, and if the power source has been turned OFF, this series of camera operations is ended.

Next is a description of an operation routine in the live-view mode (a mode in which the user captures images using live-viewing).

In step S111, a live-view display routine is executed.

Figure 21:
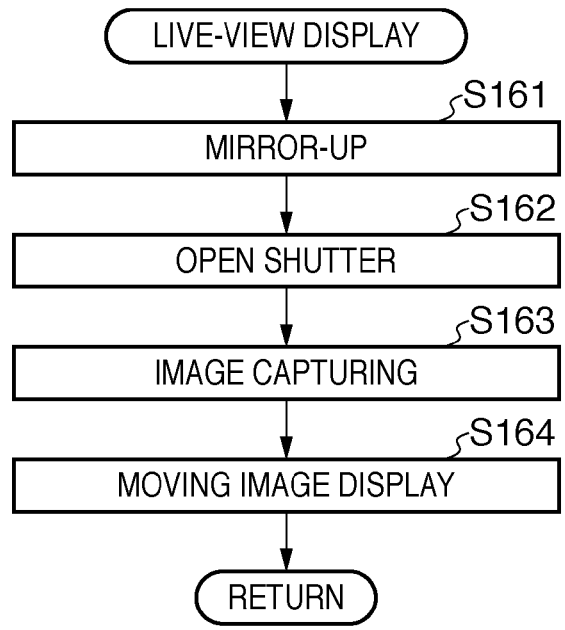
FIG. 21 is a flowchart for describing details of a live-view display routine shown in FIG. 18.

FIG. 21 is a flowchart showing the live-view display routine.

In step S161, the mirror driving motor (not shown) is controlled by the motor driving circuit 26, and the main mirror 4 and the sub mirror 7 are caused to retreat from the photographing optical path (mirror-up).

In step S162, the shutter 5 is caused to be in an open state (the state shown in FIG. 2) by the shutter driving circuit 27.

In step S163, the memory controller 21 starts reading moving images based on light received by the image sensor 6.

In step S164, the read moving images are displayed on the liquid crystal monitor 14. The user views the live-view images and determines a composition to be used in capturing. Thereafter, processing returns to step S112 in the main routine in FIG. 18.

In step S112, processing for recognizing whether a face exists in the capturing region is performed.

In step S113, an AF frame is displayed in gray superimposed on the live-view images. Here, if the existence of a face in the capturing region has been recognized in step S112, the AF frame is displayed in the recognized face region. If the non-existence of a face in the capturing region has been recognized, the AF frame is displayed in the center of the screen. In the present embodiment, as shown in FIG. 15, a person's face is detected in the center of the screen by facial recognition, and the AF frame is displayed in the face region.

In step S114, AF frame region setting is performed. As previously described, in the AF frame region setting, the AF frame regions AFARH(1) to AFARH(6) are set for lateral defocus detection, and the AF frame regions AFARV(1) to AFARV(6) are set for longitudinal defocus detection.

In step S115, whether the AF frame has been moved by the user operating the multicontroller 33 is detected, whereby processing returns to step S114 if the AF frame has been moved, and processing proceeds to step S116 if the AF frame has not been moved. As an example of moving the AF frame, there is the case in which a face has not been recognized, the AF frame is displayed in the center of the screen, and the user desires to focus on an object outside the center of the screen.

In step S116, whether the release button 30 has been pressed halfway and the SW1 is ON is determined, whereby processing proceeds to step S117 if the SW1 is ON, and if the SW1 is not ON, processing returns to step S112 in consideration of the possibility that the composition has been changed.

In step S117, an image sensing plane phase difference AF routine is executed.

Figure 22:
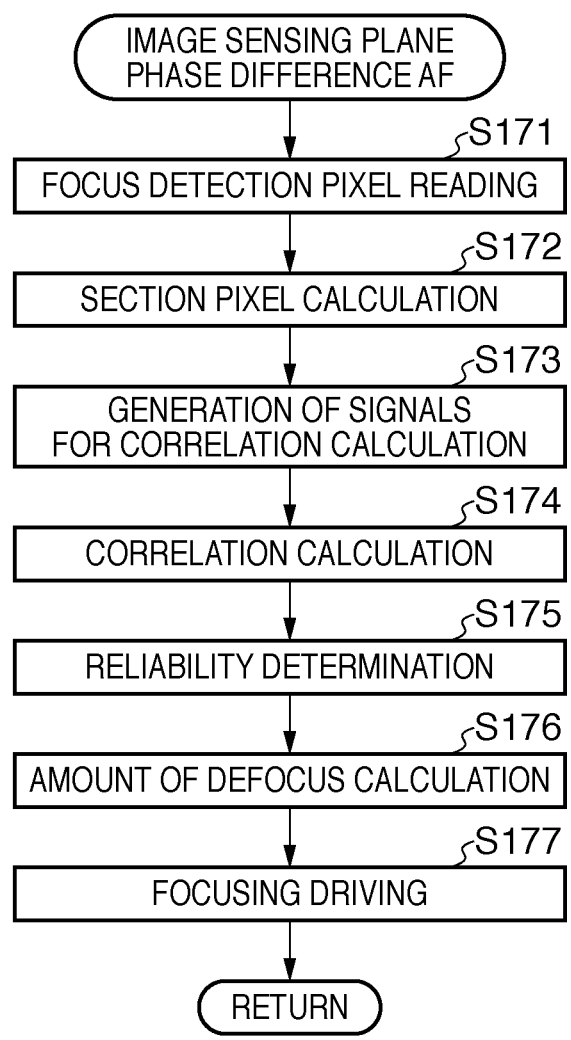
FIG. 22 is a flowchart for describing details of an image sensing plane phase difference AF routine shown in FIG. 18.

FIG. 22 is a flowchart showing the image sensing plane phase difference AF routine.

In step S171, the memory controller 21 reads, from the image sensor 6, each focus detection pixel included in the focus detection regions that have been set as the AF frame regions.

In step S172, the memory controller 21 adds the focus detection pixels in each section based on the section structure described with reference to FIG. 10 or 12, and obtains an AF pixel signal for each section based on the addition results.

In step S173, two image signals for correlation calculation are generated by the MPU 20 based on the AF pixel signals. In the present embodiment, pairs of signals that are concatenations of 60 sections, such as AFSIGH(A3) and AFSIGH(B3), and AFSIGV(C5) and AFSIGV(D5) that are shown in FIG. 15, are generated.

In step S174, the MPU 20 performs a correlation operation on the two obtained images and calculates a relative amount of defocus between the two images.

In step S175, the reliability of the correlation operation results is determined by the MPU 20.

In step S176, an amount of defocus is calculated by the MPU 20 based on a highly reliable detection result. Here, one amount of defocus in the AF frame is determined and stored.

In step S177, the amount of defocus is sent to the lens control circuit 23, and the focus lens group (not shown) in the photographing lens 3 is driven so as to be focused. Thereafter, processing returns to step S118 in the main routine in FIG. 18.

In the image sensing plane phase difference AF routine, amounts of defocus are not calculated for focus detection regions that have not be set as AF frame regions. This is because of the fact that, since the correlation operation takes a long time compared to other processing performed by the MPU 20, the processing time of the MPU 20 can be reduced, even a little, by not performing data processing for focus detection regions that are outside the AF frame and whose amounts of defocus are not necessary. Of course, if the MPU 20 has plenty of processing capability, an amount of defocus in each focus detection region may be calculated and temporarily recorded, and focus-driving may be performed quickly if the AF frame has been moved.

In step S118 in FIG. 18, the user is informed that focusing has been completed in the AF frame by changing the color of the AF frame from gray to green.

In step S119, whether the release button 30 has been fully pressed and the SW2 is ON is determined, whereby processing proceeds to step S120 if the SW2 is ON, and if the SW2 is not ON, processing waits until the SW2 becomes ON.

In step S120, a live-view capturing routine is executed.

Figure 23:
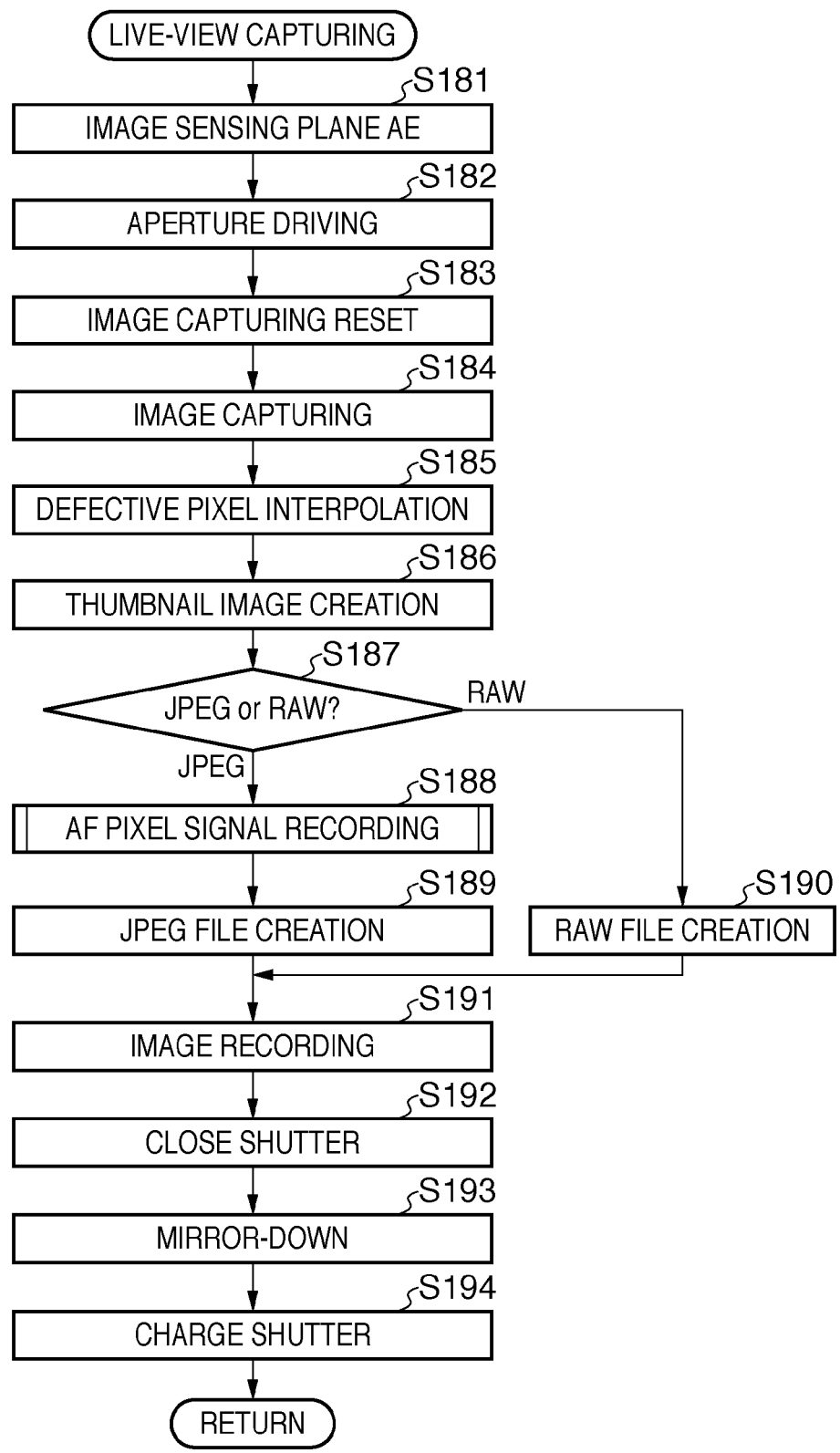
FIG. 23 is a flowchart for describing details of a live-view capturing routine shown in FIG. 18.

FIG. 23 is a flowchart showing the live-view capturing routine.

In step S181, image signals are read from the image sensor 6 by the memory controller 21, and photometry information regarding the main object being focused on and regarding the periphery thereof is obtained, that is to say, an image sensing plane AE operation is performed.

In step S182, the aperture (not shown) in the photographing lens 3 is driven by the lens control circuit 23 in accordance with a capturing exposure calculated from the image sensing plane AE result.

In step S183, the memory controller 21 resets the image signals obtained based on light received by the image sensor 6, thus reverting the light receiving state of the image sensor 6 to the initial state, that is to say, a state in which images are not captured.

In step S184, the memory controller 21 again causes the image sensor 6 to perform light reception, reads image signals, and temporarily records the image signals in the SDRAM 43.

In step S185, missing pixel interpolation is performed on the image signals read by the memory controller 21. The reason for this is that, since the output of the focus detection pixels lacks RGB color information for capturing, and such pixels correspond to defective pixels in terms of obtaining an image, image signals are generated by performing interpolation with use of information from surrounding capturing pixels. A defective pixel interpolation image is generated based on the generated image signals and original image signals, and the defective pixel interpolation image is temporarily recorded in the SDRAM 43.

In step S186, a thumbnail image is created based on the defective pixel interpolation image and temporarily recorded in the SDRAM 43 by the memory controller 21.

In step S187, whether the captured image recording quality has been selected as JPEG or RAW is determined, whereby processing proceeds to step S188 if JPEG has been selected, and processing proceeds to step S190 if RAW has been selected.

In step S188, an AF pixel signal recording routine is executed. A description of this has been omitted due to being the same control as in the flow of the AF pixel signal recording routine shown in FIG. 20.

In step S189, image processing such as white balance correction, γ correction, and edge emphasizing are performed on the defective pixel interpolation image by the image processing circuit 44, the resulting image is compressed by the image compression/expansion circuit 45 in accordance with the JPEG format, and the resulting compressed image is recorded in the compressed image data unit 69 by the memory controller 21. Also, the thumbnail image is recorded in the 1st IFD 77, and the amount of defocus data is recorded in the data recording area 85 as shown in 85a. Furthermore, various types of camera settings (e.g., shutter speed, aperture, and lens focal length) are recorded in conformity with Exif rules, and thus the image and various types of data are made into a JPEG file.

In step S190, the image signals temporarily recorded in the SDRAM 43 are recorded in RAW data 96 as shown in 96a by the memory controller 21. Also, various types of camera settings (e.g., shutter speed, aperture, and lens focal length) are recorded in the image supplementary information 93 in conformity with Exif rules, and the thumbnail image is recorded in thumbnail data 95, and thus the image and various types of data are made into a RAW file.

In step S191, the image file that is a JPEG file or a RAW file is recorded on the medium 48.

In step S192, the shutter 5 is closed by the shutter driving circuit 27.

In step S193, the mirror driving motor (not shown) is controlled by the motor driving circuit 26, and the main mirror 4 and the sub mirror 7 are caused to be in the mirror-down state (the state shown in FIG. 1).

In step S194, the conduction of power to the charge motor (not shown) is controlled by the motor driving circuit 26, and the shutter 5 is charged. Thereafter, processing returns to step S110 in the main routine in FIG. 18.

As described above, according to the present embodiment, it is possible to realize the recording of focus detection data from the moment when an image was captured in an image file. The image file format in such a case can be a general JPEG format for image files or the RAW format that enables the user to obtain an even higher quality image by performing image processing at a later time.

Although there are two image file formats, namely JPEG and RAW, in the present embodiment, the present invention is not limited to this, and for example, the uncompressed format TIFF or another format may be used. Also, although a description is given in which both JPEG and RAW are compliant with the Exif format, any format may be used as long as image data (captured image data) and image sensing plane phase difference AF data can be recorded in the image file. Also, although the image sensing plane phase difference AF data recorded in a JPEG file is amounts of defocus in focus detection regions, the range in which amounts of defocus are calculated is not limited to the focus detection regions, and for example, an amount of defocus may be calculated for each section. Moreover, the image sensing plane phase difference AF data is not limited to being amounts of defocus, but instead may be ranging data indicating, for example, a distance from the camera to the object calculated from information on the photographing lens 3 and the amounts of defocus. Furthermore, in a RAW file, the image sensing plane phase difference AF data is not recorded in the image supplementary information 93 since the focus detection pixel data is recorded in the RAW data, but recording that is similar to recording in a JPEG file may be performed.

Moreover, although the function of an image processing unit that converts captured image data into an image file and the function of a data recording unit that records image sensing plane phase difference AF data into the image file are realized by one unit, namely the memory controller 21, these functions may be realized by two or more separate units.

The present invention is applicable to an image capturing apparatus in which phase difference AF by an image sensor is possible, examples of which include not only a digital single lens reflex camera, but also a digital compact camera, a digital video camera, various types of inspection digital cameras, a surveillance digital camera, an endoscopic digital camera, and a digital camera for use in a robot. Also, the arrangement of constituent elements, numerical values, and the like that are described in the present embodiment are merely examples, and the scope of the present invention is not intended to be limited to these.

Embodiment 2

Below is a description of Embodiment 2 of the present invention with reference to the drawings. A description of the basic configuration has been omitted due to being the same as the configuration of Embodiment 1 shown in FIGS. 1 to 3, and only differing portions will be described.

Figure 24:
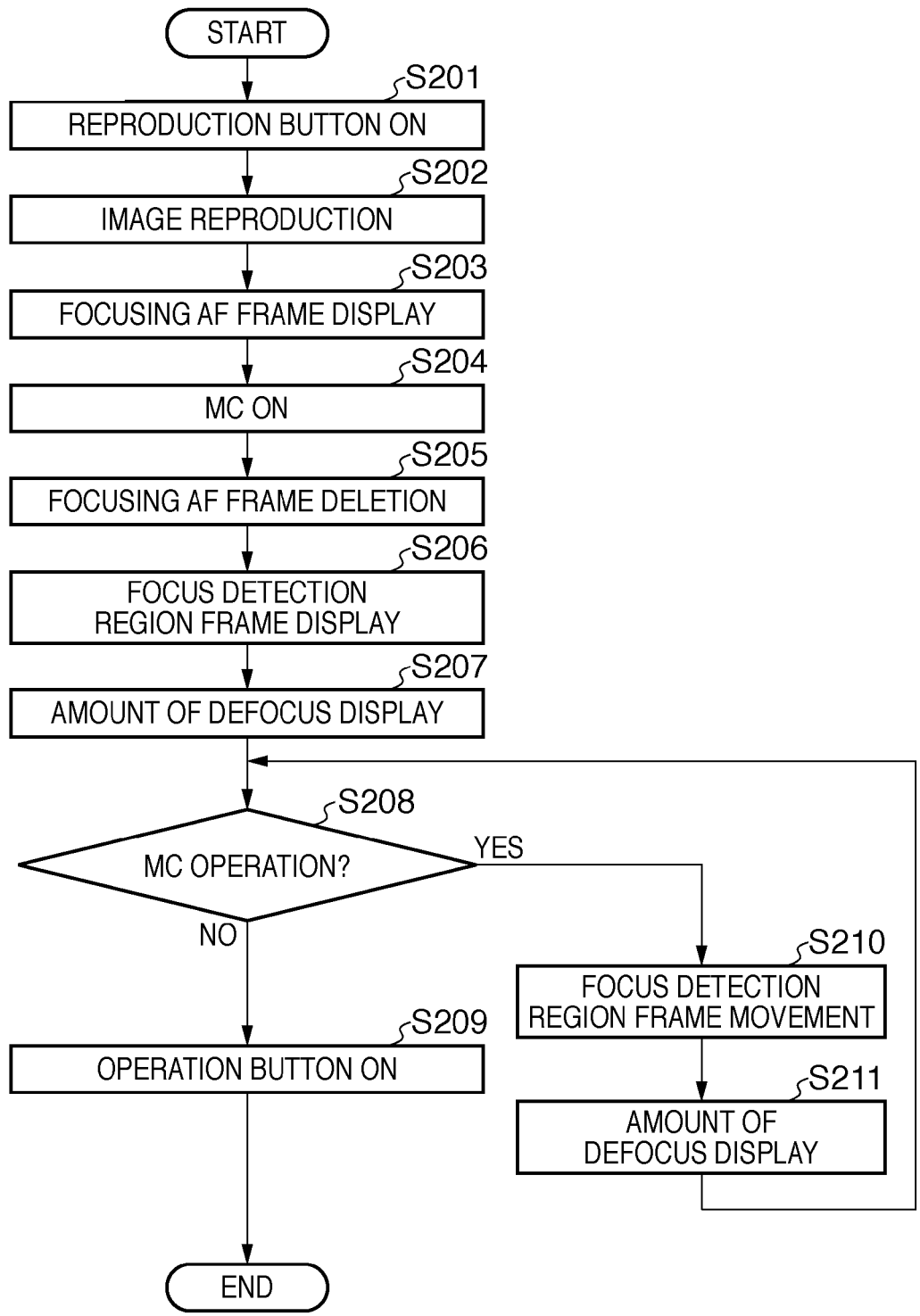
FIG. 24 is a flowchart showing operations of the digital camera shown in FIG. 1 during image reproduction.

FIG. 24 is a flowchart showing operations performed during image reproduction in the digital single lens reflex camera according to Embodiment 2.

In step S201, the reproduction button 35 is set to ON, and the camera switches from the capturing mode to the image reproduction mode.

In step S202, an image file recorded on the medium 48 by the memory controller 21 is displayed on the liquid crystal monitor 14. In the present embodiment, the medium 48 is considered to have recorded thereon the image shown in FIG. 15 that has been captured in the live-view mode and recorded as a JPEG file in Embodiment 1.

In step S203, the AF frame that was used in the focusing control performed by the lens when the image was captured is displayed superimposed on the image. For example, in the case of an image captured in the normal mode in Embodiment 1, the AF frame that corresponds to the region used when amounts of defocus were calculated by the AF sensor 8 is displayed. Also, in the case of an image captured in the live-view mode, the AF frame that has been set is displayed. Here, the display of the liquid crystal monitor 14 is as shown in FIG. 15, and the image has been captured after performing focusing control so that the amount of defocus in this AF frame is "0". Also, location information regarding this AF frame has been recorded in the data recording region 85, and is read by the memory controller 21.

In step S204, a pressing operation is performed on the multicontroller 33, and a defocus information display mode is started.

In step S205, the AF frame displayed on the liquid crystal monitor 14 is deleted.

In step S206, a focus detection region frame is displayed. In Embodiment 1, a focus detection region is one field, and an amount of defocus for each field is recorded in the JPEG file, and therefore in the present embodiment, the size of the focus detection region frame displayed on the liquid crystal monitor 14 is also equal to one field. The location of the focus detection region frame to be displayed first is the location in the AF frame where the amount of defocus is the smallest.

Figure 25:
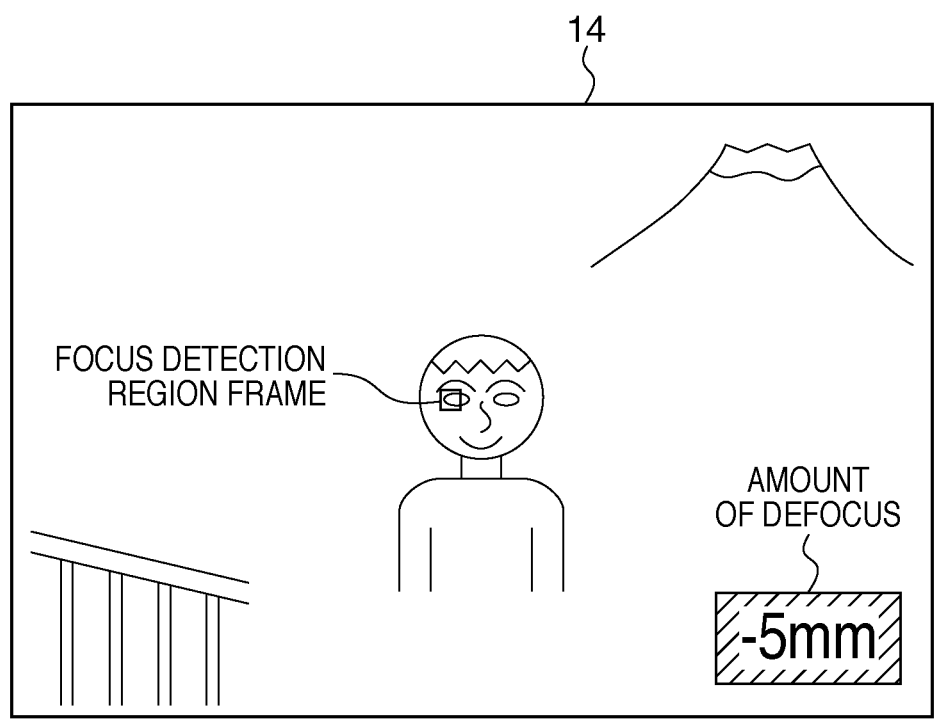
FIG. 25 is a diagram showing operations performed during the reproduction of an image on a liquid crystal monitor of the digital camera shown in FIG. 1.

In step S207, the amount of defocus at the location of the focus detection region frame that was displayed is read from the data recording region 85 in the JPEG file 60 by the memory controller 21, and is displayed on the liquid crystal monitor 14. FIG. 25 shows the state of the liquid crystal monitor 14 at this time. In FIG. 25, the amount of defocus is displayed in the lower right part of the liquid crystal monitor 14.

In step S208, whether a directional input operation has been performed on the multicontroller 33 is determined, whereby processing proceeds to step S209 if such operation has not been performed, and processing proceeds to step S210 if such operation has been performed.

In step S209, an operation button not used in the reproduction mode (e.g., the release button 30 or power source button 34) is operated, and the reproduction mode is ended.

In step S210, the focus detection region frame is moved in accordance with the operation performed on the multicontroller 33.

In step S211, the amount of defocus at the location of the focus detection region frame at the destination of the move is read from the data recording region 85 in the JPEG file 60 by the memory controller 21, and replaces the amount of defocus from before the move that is being displayed on the liquid crystal monitor 14. Thereafter, processing again returns to step S208.

As described above, the present embodiment realizes enabling the user to easily check the image sensing plane phase difference AF data recorded in an image file. Also, the present embodiment realizes enabling the user to check the image sensing plane phase difference AF data at an arbitrary position in the image as necessary.

Although control for reading and displaying the image sensing plane phase difference AF data is performed by the camera that captured the image and the liquid crystal monitor of the camera in the present embodiment, a configuration is also possible in which such control and display are performed by JPEG file processing software incorporated in an apparatus that can display images (e.g., a personal computer or a printer having a media slot). Also, although the image sensing plane phase difference AF data is amounts of defocus in focus detection regions, the range in which amounts of defocus are calculated is not limited to the focus detection regions, and for example, an amount of defocus may be calculated for each section. Also, the image sensing plane phase difference AF data is not limited to being amounts of defocus, but instead may be ranging data indicating, for example, a distance from the camera to the object calculated from information regarding the photographing lens 3 and the amounts of defocus.

Furthermore, the arrangement of constituent elements, numerical values, and the like that are described in the present embodiment are merely examples, and the scope of the present invention is not intended to be limited to these.

Embodiment 3

Below is a description of Embodiment 3 of the present invention with reference to FIGS. 26 and 27.

Figure 26:
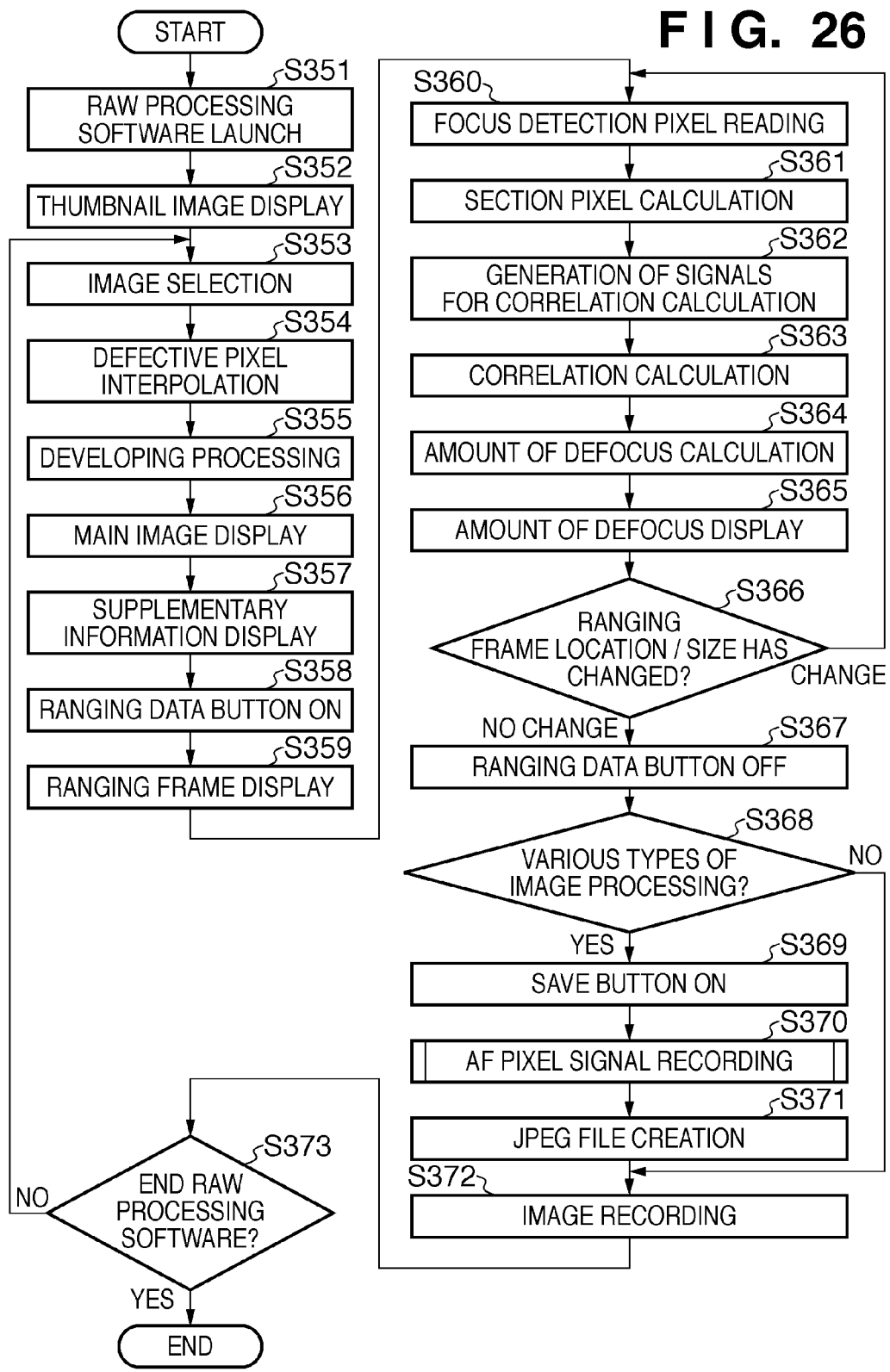
FIG. 26 is a main flowchart showing basic operations of RAW file processing software in an image processing apparatus.

FIG. 26 is a main flowchart showing basic operations of RAW file processing software in an image processing apparatus that is not shown (considered to be a personal computer in the present embodiment). FIG. 27 shows a state in which RAW file processing software 302 is being displayed on a display 301 of the personal computer.

In step S351, the RAW file processing software 302 installed in the personal computer is launched. The RAW file processing software 302 is displayed on the display 301 as shown in FIG. 27.

Figure 27:
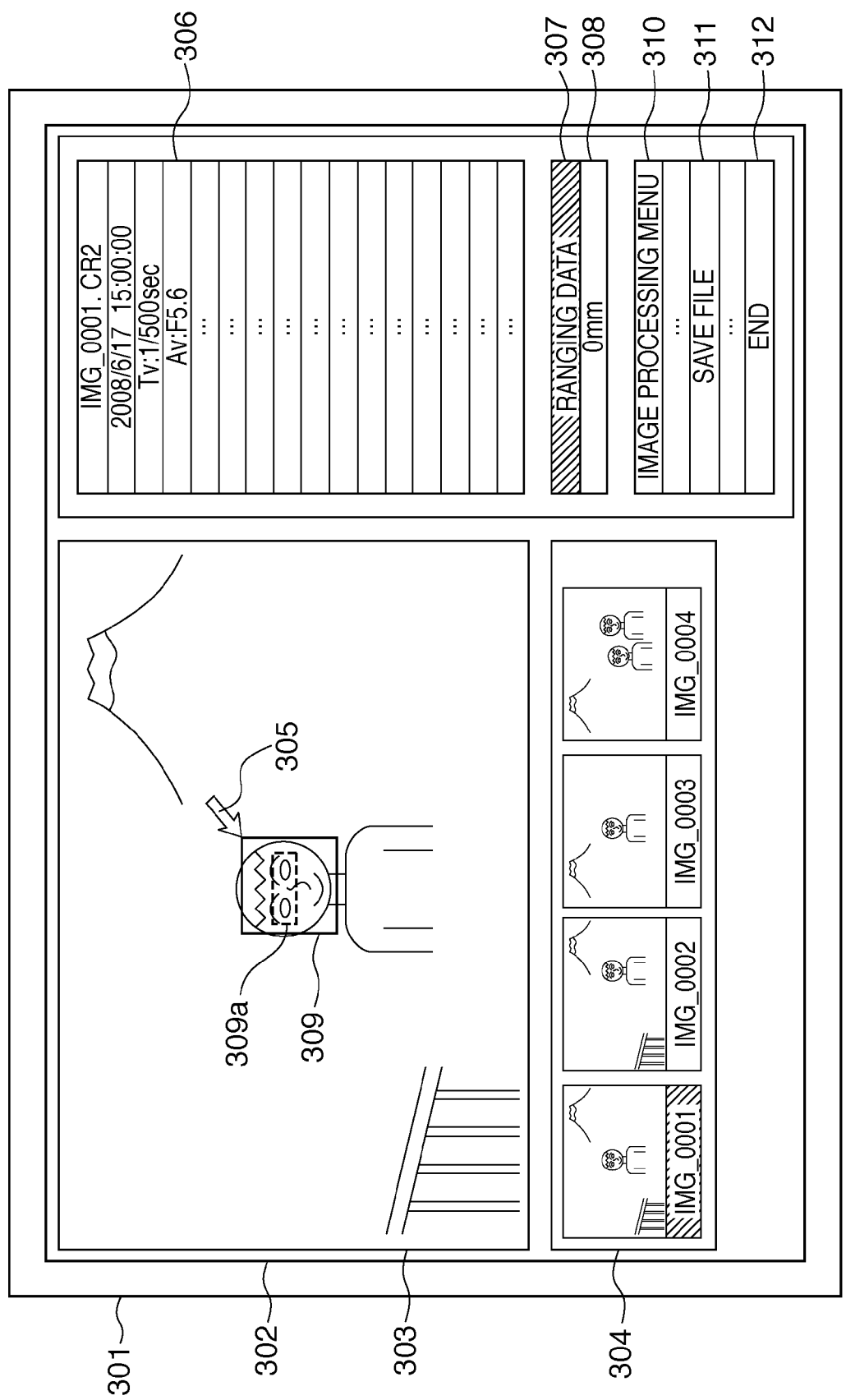
FIG. 27 is a diagram showing a condition in which the RAW file processing software is displayed on a display of the image processing apparatus.

In step S352, thumbnail data 95 is read from a RAW file 90 recorded on the HDD of the personal computer or the medium 48 inserted in the media slot of the personal computer, and the thumbnail data 95 is list-displayed as thumbnail images 304 shown in FIG. 27.

In step S353, an image on which various types of processing is to be performed is selected from among the thumbnail images 304. For example, the mouse of the personal computer is operated to move a pointer 305 over the image to be selected from among the thumbnail images 304, and the mouse is double-clicked. In FIG. 27, the leftmost image (IMG_0001) among the thumbnail images 304 is selected.

In step S354, the RAW data 96 is read from the selected RAW file 90 to a memory in the personal computer, and interpolation processing is performed for focus detection pixels that are defective pixels. Here, the memory in the personal computer has the same functions as the SDRAM 43. Likewise, the functions of the MPU 20 and the memory controller 21 are performed by the CPU of the personal computer. This defective pixel interpolation processing is executed based on the focus detection pixel location information 93a recorded in the image supplementary information 93.

In step S355, a developing parameter 94 is read from the selected RAW file 90, and the image obtained by performing defective pixel interpolation is developed in accordance with the parameter.

In step S356, the developed RAW image is displayed as a main image 303.

In step S357, the image supplementary information 93 is read from the selected RAW file 90 and displayed in a supplementary information region 306.

In step S358, a ranging data button 307 of the RAW file processing software 302 is set to ON. For example, the pointer 305 is moved over the ranging data button 307 and double-clicked.

In step S359, a ranging frame 309 is displayed over the main image 303. The location and size of the ranging frame 309 to be displayed first conform to the AF frame used for focusing control performed by the lens when the image was captured. Here, the image is considered to be the image of Embodiment 1 shown in FIG. 15 that was captured in the live-view mode, and the ranging frame 309 is displayed at the same size and location as the AF frame set in FIG. 15. Also, information regarding this AF frame has been recorded in the image supplementary information 93. In FIG. 27, the color of characters displayed in the ranging data button 307 are inverted in order to indicate that the location and size of the ranging frame 309 can be changed.

In step S360, the data of the focus detection pixels included in each focus detection region in the ranging frame 309 is read.

In step S361, the focus detection pixels in each section are added together based on the section structure described with reference to FIG. 10 or 12, and an AF pixel signal for each section is obtained based on the addition results.

In step S362, two image signals for correlation calculation are generated based on the AF pixel signals.

In step S363, a correlation operation is performed on the two obtained images, and a relative amount of defocus between the two images is calculated.

In step S364, an amount of defocus is calculated.

In step S365, an amount of defocus 308 is displayed. In FIG. 27, the ranging frame 309 is the same as the AF frame set at the time of capturing, and therefore "0 mm" is displayed as the amount of defocus.

In step S366, whether the location and size of the ranging frame 309 have been changed is determined. If the location and size have been changed, processing proceeds to step S360, the amount of defocus is re-calculated in accordance with the changed location and size, and the amount of defocus is displayed (step S360 to step S365). If the location and size have not been changed, processing proceeds to step S367. As an example of a method for changing the location and size of the ranging frame 309, the ranging frame 309 can be moved to a desired place on the main image 303 by placing the pointer 305 on the frame line of the ranging frame 309 and dragging it. Also, if the pointer 305 is placed on one of the four corners of the ranging frame 309, and the corner is dragged, only the two frame lines constituting the corner are moved, thus changing the size of the ranging frame 309. For example, the location and size of the ranging frame can be changed as indicated by a ranging frame 309a.

In step S367, the ranging data button 307 is set to OFF. When set to OFF, the ranging frame 309 is deleted from the main image 303.

In step S368, whether various types of image processing have been performed on the main image 303 is determined, whereby processing proceeds to step S369 if image processing has been performed, and processing proceeds to step S373 if image processing has not been performed. In image processing, if an image processing menu button 310 is set to ON, a menu screen (not shown) is displayed, and a menu item that matches the user's intention is selected from the menu screen and executed.

In step S369, a file save button 311 for saving the image on which various types of image processing has been performed is set to ON.

In step S370, the AF pixel signal recording routine is executed. A detailed description of this routine has been omitted due to being basically the same as the flow of the AF pixel signal recording routine in Embodiment 1 shown in FIG. 20 (step S151 to step S156). In the present embodiment, the functions that were described as being performed by the MPU 20 and the memory controller 21 in the description with reference to FIG. 20 are instead performed by the CPU of the personal computer, and the functions that were described as being performed by the SDRAM 43 are instead performed by the memory of the personal computer.

In step S371, the image on which image processing was performed is compressed in accordance with the JPEG format and recorded in the compressed image data unit 69. Also, the thumbnail data 95 is recorded in the 1st IFD 77, and the amount of defocus data is recorded in the data recording region 85 as indicated by reference character 85a. Furthermore, various types of camera settings (e.g., shutter speed, aperture, and lens focal length) are recorded in conformity with Exif rules, and thus the image and various types of data are made into a JPEG file. Although the JPEG format is used in file creation in the above description, the TIFF format or another image file format may be used.

In step S372, the image file that has been made into a JPEG file is recorded on the medium 48 or on the HDD of the personal computer.

In step S373, whether an end button 312 has been operated is determined, whereby the RAW file processing software 302 is ended if such operation has been performed, and if such operation has not been performed, processing proceeds to step S353, and thereafter other image processing is performed.

As described above, according to the present embodiment, it is possible to enable the user to easily check the image sensing plane phase difference AF data recorded in an image file. Also, the present embodiment realizes enabling the user to check the image sensing plane phase difference AF data at an arbitrary location in the image as necessary.

Although processing for calculating and displaying the image sensing plane phase difference AF data is performed by the personal computer and the RAW file processing software incorporated in the personal computer in the present embodiment, any form is possible as long as a digital camera or apparatus capable of displaying images is used. Also, although the image sensing plane phase difference AF data is amounts of defocus in focus detection regions, the range in which amounts of defocus are calculated is not limited to the focus detection regions, and for example, an amount of defocus may be calculated for each section. Also, the image sensing plane phase difference AF data is not limited to being amounts of defocus, but instead may be ranging data indicating, for example, a distance from the camera to the object calculated from information regarding the photographing lens 3 and the amounts of defocus.

Furthermore, the arrangement of constituent elements, numerical values, and the like that are described in the present embodiment are merely examples, and the scope of the present invention is not intended to be limited to these.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image capturing apparatus comprising:
   an image sensor having a first pixel group that photoelectrically converts an object image from a first exit pupil region that is part of an exit pupil region of a photographing lens, a second pixel group that photoelectrically converts an object image from a second exit pupil region that is different from the first exit pupil region, and a third pixel group that photoelectrically converts an object image from an exit pupil region that includes the first exit pupil region and the second exit pupil region;
   a focus detection unit that detects focus information of the photographing lens by performing a defocus calculation with use of a first image signal obtained from the first pixel group and a second image signal obtained from the second pixel group;
   an image processing unit that converts captured image data into image data for recording and saving, wherein the captured image data includes image data that has been photoelectrically converted by the third pixel group of the image sensor, and wherein the captured image data includes image data that has been generated by performing interpolation at a first pixel group position and a second pixel group position, with use of information from the third pixel group; and
   a data recording unit that records the image data as an image file, wherein the data recording unit records, in association with the image file, location information of the first pixel group and the second pixel group and signals obtained from the first pixel group and the second pixel group such that the defocus calculation can be performed,
   wherein the captured image data and the signals obtained from the first pixel group and the second pixel group are recorded in different regions in the image file, and
   wherein signals obtained from the first pixel group and the second pixel group are recorded in an attached information recording region in an Exif format image file.

2. The image capturing apparatus according to claim 1, wherein the captured image data is image data obtained by performing A/D conversion on a signal output from the image sensor and thereafter performing image processing on the resulting signal in accordance with a setting value of the image capturing apparatus.

3. The image capturing apparatus according to claim 2, wherein the image data is image data on which compression processing has been performed.

4. The image capturing apparatus according to claim 2, wherein the image data is image data on which compression processing has not been performed.

5. The image capturing apparatus according to claim 1, wherein the captured image data is RAW data obtained by performing A/D conversion on a signal output from the image sensor.

6. The image capturing apparatus according to claim 5, wherein output data of the first pixel group and the second pixel group has been recorded in the RAW data.

7. The image capturing apparatus according to claim 1, wherein the signals obtained from the first pixel group and the second pixel group such that the defocus calculation can be performed are amounts of defocus that have been calculated from output data of the first pixel group and the second pixel group.

8. The image capturing apparatus according to claim 1, wherein the signals obtained from the first pixel group and the second pixel group such that the defocus calculation can be performed are ranging data that has been calculated from output data of the first pixel group and the second pixel group.

9. An image capturing apparatus comprising:
   an image sensor having a first pixel group that photoelectrically converts an object image from a first exit pupil region that is part of an exit pupil region of a photographing lens, a second pixel group that photoelectrically converts an object image from a second exit pupil region that is different from the first exit pupil region, and a third pixel group that photoelectrically converts an object image from an exit pupil region that includes the first exit pupil region and the second exit pupil region;
   a focus detection unit that detects focus information of the photographing lens by performing a defocus calculation with use of a first image signal obtained from the first pixel group and a second image signal obtained from the second pixel group;
   an image processing unit that converts captured image data into image data for recording and saving, wherein the captured image data includes image data that has been photoelectrically converted by the third pixel group of the image sensor, and wherein the captured image data includes image data that has been generated by performing interpolation at a first pixel group position and a second pixel group position, with use of information from the third pixel group; and a data recording unit that records the image data as an image file, wherein the data recording unit records, in association with the image file, location information of the first pixel group and the second pixel group and signals obtained from the first pixel group and the second pixel group such that the defocus calculation can be performed, wherein the captured image data and the signals obtained from the first pixel group and the second pixel group such that the defocus calculation can be performed are recorded in the same region in the image file, and wherein the location information of the first pixel group and the second pixel group is recorded in an attached information recording region in an Exif format image file.

10. The image capturing apparatus according to claim 9, wherein the captured image data is RAW data obtained by performing A/D conversion on a signal output from the image sensor.

11. The image capturing apparatus according to claim 10, wherein output data of the first pixel group and the second pixel group has been recorded in the RAW data.

12. The image capturing apparatus according to claim 9, wherein the signals obtained from the first pixel group and the second pixel group such that the defocus calculation can be performed are amounts of defocus that have been calculated from output data of the first pixel group and the second pixel group.

13. The image capturing apparatus according to claim 9, wherein the signals obtained from the first pixel group and the second pixel group such that the defocus calculation can be performed are ranging data that has been calculated from output data of the first pixel group and the second pixel group.

14. An image capturing apparatus comprising:

an image sensor having a first pixel group that photoelectrically converts an object image from a first exit pupil region that is part of an exit pupil region of a photographing lens, a second pixel group that photoelectrically converts an object image from a second exit pupil region that is different from the first exit pupil region, and a third pixel group that photoelectrically converts an object image from an exit pupil region that includes the first exit pupil region and the second exit pupil region;

a focus detection unit that detects focus information of the photographing lens by performing a defocus calculation with use of a first image signal obtained from the first pixel group and a second image signal obtained from the second pixel group;

an image processing unit that converts captured image data into image data for recording and saving, wherein the captured image data includes image data that has been photoelectrically converted by the third pixel group of the image sensor, and wherein the captured image data includes image data that has been generated by performing interpolation at a first pixel group position and a second pixel group position, with use of information from the third pixel group; and a data recording unit that records the image data as an image file, wherein the data recording unit records, in association with the image file, location information of the first pixel group and the second pixel group and signals obtained from the first pixel group and the second pixel group such that the defocus calculation can be performed, wherein the captured image data and the signals obtained from the first pixel group and the second pixel group are recorded in different regions in the image file, and wherein the location information of the first pixel group and the second pixel group is recorded in an attached information recording region in an Exif format image file.

15. The image capturing apparatus according to claim 14, wherein the captured image data is image data obtained by performing A/D conversion on a signal output from the image sensor and thereafter performing image processing on the resulting signal in accordance with a setting value of the image capturing apparatus.

16. The image capturing apparatus according to claim 15, wherein the image data is image data on which compression processing has been performed.

17. The image capturing apparatus according to claim 15, wherein the image data is image data on which compression processing has not been performed.

18. The image capturing apparatus according to claim 14, wherein the captured image data is RAW data obtained by performing A/D conversion on a signal output from the image sensor.

19. The image capturing apparatus according to claim 18, wherein output data of the first pixel group and the second pixel group has been recorded in the RAW data.

20. The image capturing apparatus according to claim 14, wherein the signals obtained from the first pixel group and the second pixel group such that the defocus calculation can be performed are amounts of defocus that have been calculated from output data of the first pixel group and the second pixel group.

21. The image capturing apparatus according to claim 14, wherein the signals obtained from the first pixel group and the second pixel group such that the defocus calculation can be performed are ranging data that has been calculated from output data of the first pixel group and the second pixel group.

* * * * *